US012756820B2

(12) United States Patent
Xiu et al.

(10) Patent No.: US 12,756,820 B2
(45) **Date of Patent: *Oct. 6, 2026**

(54) COMBINED INTER AND INTRA PREDICTION

(71) Applicant: InterDigital VC Holdings, Inc., Wilmington, DE (US)

(72) Inventors: Xiaoyu Xiu, San Diego, CA (US); Yuwen He, San Diego, CA (US); Jiancong Luo, Skillman, NJ (US)

(73) Assignee: InterDigital VC Holdings, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/987,219

(22) Filed: Dec. 19, 2024

(65) Prior Publication Data

US 2025/0119532 A1 Apr. 10, 2025

Related U.S. Application Data

(63) Continuation of application No. 17/420,080, filed as application No. PCT/US2019/068008 on Dec. 20, 2019, now Pat. No. 12,219,126.

(Continued)

(51) Int. Cl.
*H04N 19/82* (2014.01)
*H04N 19/105* (2014.01)

(Continued)

(52) U.S. Cl.
CPC ......... *H04N 19/105* (2014.11); *H04N 19/159* (2014.11); *H04N 19/176* (2014.11); *H04N 19/46* (2014.11)

(58) Field of Classification Search
CPC .. H04N 19/105; H04N 19/159; H04N 19/176; H04N 19/46
See application file for complete search history.

(56) References Cited

U.S. PATENT DOCUMENTS 10,306,240 B2 5/2019 Xiu et al.
11,252,405 B2 2/2022 Lee (Continued)

FOREIGN PATENT DOCUMENTS

CN 103503453 A 1/2014
CN 105493505 A 4/2016

(Continued)

OTHER PUBLICATIONS

"VTM-3.0 Reference Software", Available at <https://vcgit.hhi.fraunhofer.de/jvet/VVCSoftware_VTM/tags/VTM-3.0>, 1 page.

(Continued)

*Primary Examiner* — Patrick E Demosky
(74) *Attorney, Agent, or Firm* — Condo Roccia Koptiw LLP

(57) ABSTRACT

Systems, methods, and instrumentalities are disclosed for a combined inter and intra prediction. A video coding device may receive a motion vector difference (MMVD) mode indication that indicates whether MMVD mode is used to generate inter prediction of a coding unit (CU). The video coding device may receive a combined inter merge/intra prediction (CIIP) indication, for example, when the MMVD mode indication indicates that MMVD mode is not used to generate the inter prediction of the CU. The video coding device may determine whether to use triangle merge mode for the CU, for example, based on the MMVD mode indication and/or the CIIP indication. On a condition that the CIIP indication indicates that CIIP is applied for the CU or the MMVD mode indication indicates that MMVD mode is used to generate the inter prediction, the video coding device may disable the triangle merge mode for the CU.

20 Claims, 14 Drawing Sheets

Related U.S. Application Data

(60) Provisional application No. 62/786,653, filed on Dec. 31, 2018.

(51) Int. Cl.

| | |
|---|---|
| ***H04N 19/159*** | (2014.01) |
| ***H04N 19/176*** | (2014.01) |
| ***H04N 19/46*** | (2014.01) |

(56) References Cited

U.S. PATENT DOCUMENTS

| | | | | |
|---|---|---|---|---|
| 2013/0266232 | A1 | 10/2013 | Sato | |
| 2016/0316200 | A1 | 10/2016 | Zhang et al. | |
| 2017/0366807 | A1 | 12/2017 | Thoreau et al. | |
| 2018/0199054 | A1 | 7/2018 | Hsu | |
| 2018/0220130 | A1 | 8/2018 | Zhang et al. | |
| 2018/0288410 | A1 | 10/2018 | Park et al. | |
| 2020/0154101 | A1 | 5/2020 | Li et al. | |
| 2020/0162737 | A1 | 5/2020 | Van Der Auwera et al. | |
| 2020/0177873 | A1 * | 6/2020 | Li | H04N 19/593 |
| 2020/0213593 | A1 | 7/2020 | Chiang et al. | |
| 2021/0243476 | A1 | 8/2021 | Ko et al. | |
| 2025/0227251 | A1 | 7/2025 | Li et al. | |

FOREIGN PATENT DOCUMENTS

| | | | |
|---|---|---|---|
| CN | 105934948 | A | 9/2016 |
| CN | 107646195 | A | 1/2018 |
| EP | 3 891 975 | A1 | 10/2021 |
| EP | 4 277 277 | A2 | 11/2023 |
| JP | 2021-524176 | A | 9/2021 |
| WO | 2019/068008 | A1 | 4/2019 |
| WO | 2020/085800 | A1 | 4/2020 |
| WO | 2020/096389 | A1 | 5/2020 |
| WO | 2020/117619 | A1 | 6/2020 |
| WO | 2020/142279 | A1 | 7/2020 |

OTHER PUBLICATIONS

Ahn et al., "CE4-Related: Syntax Changes of Merge Data", JVET-M0369-V1, Digital Insights Inc., Joint Video Experts Team (JVET) of ITU-T SG 16 WP 3 and ISO/IEC JTC 1/SC 29/WG 11, 13th Meeting: Marrakech, MA, Jan. 9-18, 2019, pp. 1-5.

Alshina, et al., "Known Tools Performance Investigation for Next Generation Video Coding", VCEG-AZ05, Samsung Electronics, ITU—Telecommunications Standardization Sector, Study Group 16 Question 6, Video Coding Experts Group (VCEG), 52nd Meeting, Warsaw, Poland, Jun. 19-26, 2015, 5 pages.

Bross, et al., "High Efficiency Video Coding (HEVC) Text Specification Draft 10 (for FDIS & Last Call)", JCTVC-L1003_V34, Editor, Joint Collaborative Team on Video Coding (JCT-VC) of ITU-T SG 16 WP 3 and ISO/IEC JTC 1/SC 29/WG 11, 12th Meeting: Geneva, CH, Jan. 14-23, 2013, 310 pages.

Bross, et al., "Versatile Video Coding (Draft 3)", JVET-L1001-V7, Editors, Joint Video Experts Team (JVET) of ITU-T SG 16 WP 3 and ISO/IEC JTC 1/SC 29/WG 11, 12th Meeting: Macao, CN, Oct. 3-12, 2018, 223 pages.

Chen, et al., "Algorithm Description for Versatile Video Coding and Test Model 3 (VTM 3)", JVET-L1002-V1, Editors, Joint Video Experts Team (JVET) of ITU-T SG 16 WP 3 and ISO/IEC JTC 1/SC 29/WG 11, 12th Meeting: Macao, CN, Date Saved: Dec. 24, 2018, Oct. 3-12, 2018, 48 pages.

Chen, et al., "Coding Tools Investigation for Next Generation Video Coding", Qualcomm Incorporated, COM 16—C 806—E, International Telecommunication Union, Telecommunication Standardization Sector, Jan. 2015, pp. 1-7.

Chen, et al., "Non-CE4: Regular Merge Flag Coding", JVET-M0231, Kwai Inc., Joint Video Experts Team (JVET) of ITU-T SG 16 WP 3 and ISO/IEC JTC 1/SC 29/WG 11, 13th Meeting: Marrakech, MA, Jan. 9-18, 2019, pp. 1-3.

Chiang, et al., "CE10-Related: Syntax Redundancy Removal in Triangle Prediction", JVET-M0185-V1, MediaTek Inc., Joint Video Experts Team (JVET) of ITU-T SG 16 WP 3 and ISO/IEC JTC 1/SC 29/WG 11, 13th Meeting: Marrakech, MA, Jan. 9-18, 2019, 3 pages.

Hsu, et al., "Description of Core Experiment 10: Combined and Multi-Hypothesis Prediction", JVET-J1030, CE Coordinators, Joint Video Experts Team (JVET) of ITU-T SG 16 WP 3 and ISO/IEC JTC 1/SC 29/WG 11, 10th Meeting: San Diego, US, Apr. 10-20, 2018, pp. 1-9.

ITU-T, "Advanced Video Coding for Generic Audiovisual Services", ITU-T Recommendation H.264, Series H: Audiovisual and Multimedia Systems, Infrastructure of Audiovisual Services—Coding of Moving Video, Nov. 2007, 563 pages.

Karczewicz, et al., "Report of AHG1 on Coding Efficiency Improvements", VCEG-AZ01, Qualcomm, Samsung, ITU—Telecommunications Standardization Sector, Study Group 16 Question 6, Video Coding Experts Group (VCEG), 52nd Meeting: Warsaw, Poland, Jun. 19-26, 2015, 2 pages.

Liao, et al., "CE10 Related: Combining Multi-Hypothesis Prediction with Triangular Prediction Unit Mode", JVET-K0148-V2, Panasonic, Joint Video Exploration Team (JVET) of ITU-T SG 16 WP 3 and ISO/IEC JTC 1/SC 29/WG 11, 11th Meeting: Ljubljana, SI, Jul. 10-18, 2018, 4 pages.

Ohm, et al., "Report of AHG on Future Video Coding Standardization Challenges", AHG, ISO/IEC JTC1/SC29/WG11 MPEG2014/M36782, Warsaw, Poland, Jun. 2015, 4 pages.

Ruoyang, "Triangle flag redundant signalling", #105 closed defect (wontfix), JVET VVC, Apr. 2020, 1 page.

Segall, et al., "Joint Call for Proposals on Video Compression with Capability Beyond HEVC", JVET-H1002 (V6), Editors, Joint Video Exploration Team (JVET) of ITU-T SG 16 WP 3 and ISO/IEC JTC 1/SC 29/WG 11, 8th Meeting: Macao, CN, Oct. 18-24, 2017, 27 pages.

SMPTE, "VC-1 Compressed Video Bitstream Format and Decoding Process", SMPTE 421M, Feb. 24, 2006, 493 pages.

Tourapis, et al., "H.264/14496-10 AVC Reference Software Manual", JVT-AE010, Dolby Laboratories Inc., Fraunhofer-Institute HHI, Microsoft Corporation, Joint Video Team (JVT) of ISO/IEC MPEG & ITU-T VCEG (ISO/IEC JTC1/SC29/WG11 and ITU-T SG16 Q.6), 31st Meeting: London, UK, Jun. 28-Jul. 3, 2009, 90 pages.

Yu, Ruoyang, "CE10-Related: A Fix for Merge_Triangle_Flag Signaling", JVET-M0118, Ericsson, Joint Video Experts Team (JVET) of ITU-T SG 16 WP 3 and ISO/IEC JTC 1/SC 29/WG 11, 13th Meeting: Marrakech, MA, Jan. 9-18, 2019, 7 pages.

* cited by examiner

COMBINED INTER AND INTRA PREDICTION

CROSS REFERENCE TO RELATED APPLICATIONS

This application is a continuation application of U.S. Non-Provisional application Ser. No. 17/420,080, filed Jun. 30, 2021, which is the National Stage Entry under 35 U.S.C. § 371 of Patent Cooperation Treaty Application No. PCT/US2019/068008, filed Dec. 20, 2019, which application claims priority to U.S. provisional patent application No. 62/786,653, filed Dec. 31, 2018, which is incorporated herein by reference in its entirety.

BACKGROUND

Video coding systems are widely used to compress digital video signals to reduce the storage needs and/or transmission bandwidth of such signals. Among the various types of video coding systems, such as block-based, wavelet-based, and object-based systems, block-based hybrid video coding systems are widely used and deployed.

SUMMARY

Systems, methods, and instrumentalities are disclosed for a combined inter and intra prediction. A video coding device may receive a motion vector difference (MMVD) mode indication that indicates whether MMVD mode is used to generate inter prediction of a coding unit. The video coding device may receive a combined inter merge/intra prediction (CIIP) indication, for example, when the MMVD mode indication indicates that MMVD mode is not used to generate the inter prediction of the coding unit. The video coding device may determine whether to use triangle merge mode for the coding unit, for example, based on the MMVD mode indication and/or the CLIP indication. The CIIP indication may not be received when the MMVD mode indication indicates that MMVD mode is used for the coding unit. The MMVD mode indication may be received per coding unit.

On a condition that the CIIP indication indicates that CIIP is applied for the coding unit, the video coding device may disable the triangle merge mode for the coding unit. On a condition that the MMVD mode indication indicates that MMVD mode is used to generate the inter prediction, the video coding device may disable the triangle merge mode for the coding unit. On a condition that the CIIP indication indicates that CIIP is not applied for the coding unit and the MMVD mode indication indicates that MMVD mode is not used to generate the inter prediction, the video coding device may enable the triangle merge mode for the coding unit. The video coding device may enable the triangle merge mode for the coding unit without receiving a triangle merge flag. The video coding device may infer whether to enable the triangle merge mode for the coding unit based on one or more of the MMVD mode indication or the CIIP indication. The CIIP indication may not be received when the MMVD mode indication indicates that MMVD mode is used for the coding unit. The MMVD mode indication may be received on a per coding unit basis.

DETAILED DESCRIPTION

Coding tools that may provide higher coding efficiency and moderate implementation complexity may include one or more of the following: affine motion model, alternative temporal motion vector prediction or advanced temporal motion vector prediction (ATMVP), integer motion vector (IMV), generalized bi-prediction (GBi), bi-directional optical flow (BDOF), combined inter merge/intra prediction (CIIP), merge with motion vector difference (MMVD), pairwise average merge candidate, triangular inter prediction for inter coding, cross-component linear model (CCLM), multi-line intra prediction, current picture referencing (CPR) for intra prediction; enhanced multiple transform (EMT), dependent quantization for quantization and transform coding, and adaptive loop filtering (ALF) for in-loop filters.

Figure 1:
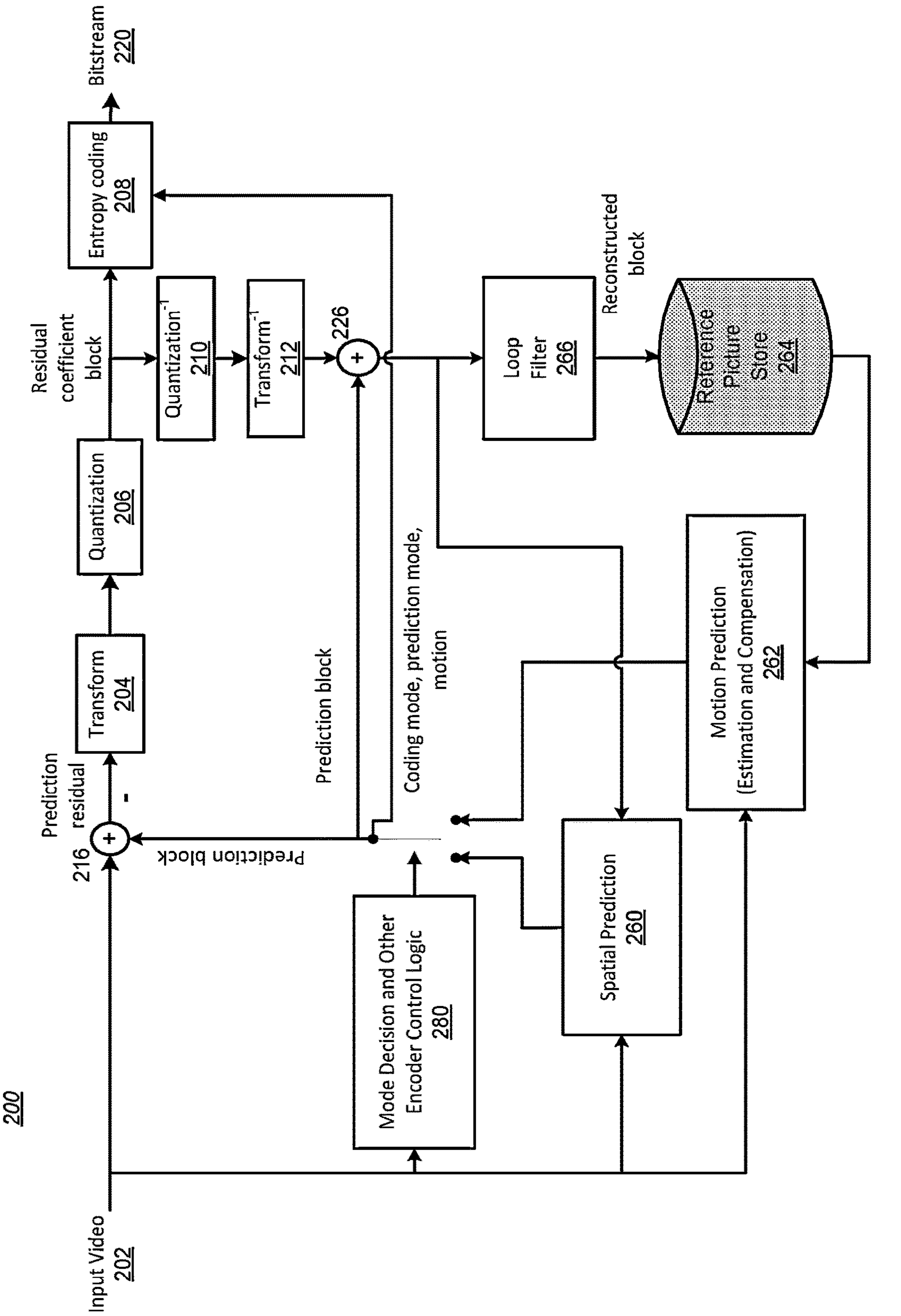
FIG. 1 illustrates an exemplary diagram of a block-based video encoder.
Figure 2:
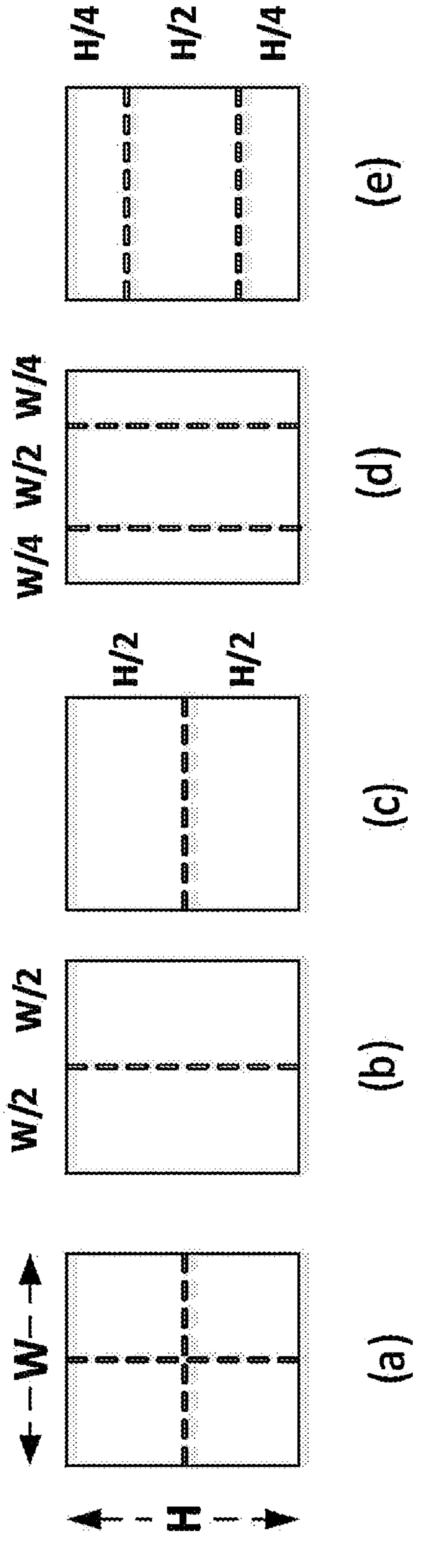
FIG. 2A illustrates an example associated with block partitions in a multi-type tree structure and quaternary partition.
FIG. 2B illustrates an example associated with block partitions in a multi-type tree structure and vertical binary partition.
FIG. 2C illustrates an example associated with block partitions in a multi-type tree structure and horizontal binary partition.
FIG. 2D illustrates an example associated with block partitions in a multi-type tree structure and vertical ternary partition.
FIG. 2E illustrates an example associated with block partitions in a multi-type tree structure and horizontal ternary partition.

FIG. 1 shows a block diagram of an example block-based hybrid video encoding system 200. The input video signal 202 may be processed block by block. Extended block sizes (e.g., referred to as a coding unit or CU) may be used to compress high resolution (e.g., 1080p and/or beyond) video signals. A CU may include sizes of up to 128×128 pixels. Blocks may be partitioned based on quad-trees. A coding tree unit (CTU) may be split into CUs to adapt to varying local characteristics based on quad/binary/ternary-tree. A CU may or may not be partitioned into prediction units or PUs, for which separate predictions may be applied. A CU may be used as the basic unit for prediction and transform without further partitions. In a multi-type tree structure, a (e.g., one) CTU may be partitioned (e.g., may be firstly partitioned) by a quad-tree structure. A quad-tree leaf node (e.g., each quad tree leaf node) may be further partitioned by a binary and ternary tree structure. As shown in FIG. 2, there may be one or more (e.g., five) splitting types. One or more of the following may be example splitting types: quaternary partitioning (e.g., (a), horizontal binary partitioning (e.g., (c), vertical binary partitioning (e.g., (b)), horizontal ternary partitioning (e.g., (e)), and vertical ternary partitioning (e.g., (d)).

Referring to FIG. 1, for an input video block (e.g., a macroblock (MB) or CU), spatial prediction 260 or motion prediction 262 may be performed. Spatial prediction (e.g., or intra prediction) may use pixels from already coded neighboring blocks in the same video picture and/or slice to predict a current video block. Spatial prediction may reduce spatial redundancy inherent in the video signal. Motion prediction (e.g., referred to as inter prediction or temporal prediction) may use pixels from already coded video pictures to predict a current video block. Motion prediction may reduce temporal redundancy inherent in the video signal. A motion prediction signal for a given video block may be signaled by a motion vector that indicates the amount and/or direction of motion between the current block and its reference block. If multiple reference pictures are supported, the reference picture index of a video block may be signaled to a decoder. The reference index may be used to identify from which reference picture in a reference picture store 464 the temporal prediction signal may come.

After spatial and/or motion prediction, a mode decision 280 in the encoder may select a prediction mode, for example based on a rate-distortion optimization. The prediction block may be subtracted from the current video block at 216. Prediction residuals may be de-correlated using a transform module 204 and a quantization module 206 to achieve a target bit-rate. The quantized residual coefficients may be inverse quantized at 210 and inverse transformed at 212 to form reconstructed residuals. The reconstructed residuals may be added back to the prediction block at 226 to form a reconstructed video block. An in-loop filter such as a de-blocking filter and/or an adaptive loop filter may be applied to the reconstructed video block at 266 before it is put in the reference picture store 264. Reference pictures in the reference picture store 264 may be used to code future video blocks. An output video bit-stream 220 may be formed. Coding mode (e.g., inter or intra), prediction mode information, motion information, and/or quantized residual coefficients may be sent to an entropy coding unit 208 to be compressed and packed to form the bit-stream 220.

Figure 3:
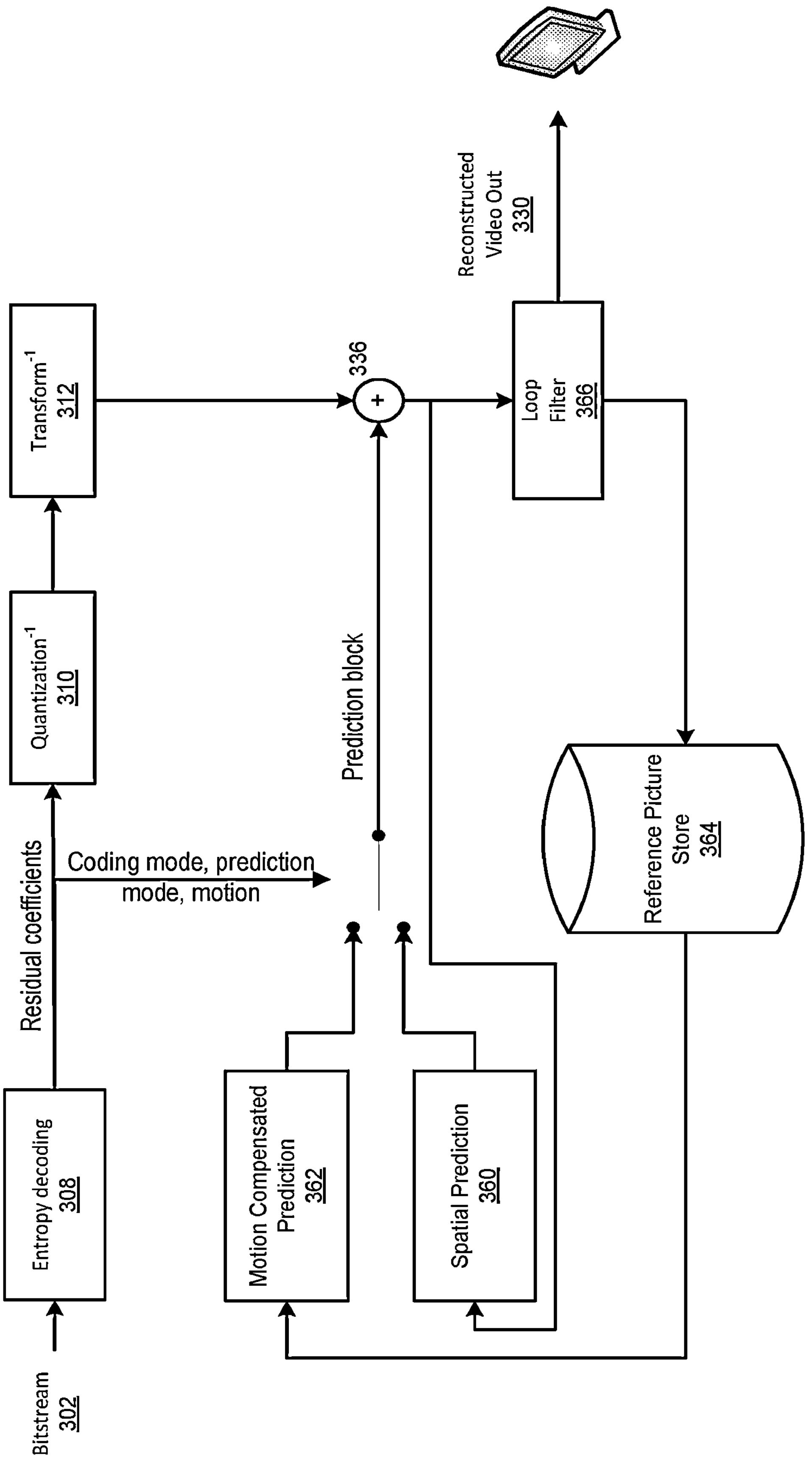
FIG. 3 illustrates an exemplary diagram of a block-based video decoder.

FIG. 3 shows a general block diagram of an example block-based video decoder. A video bit-stream 302 may be received, unpacked, and/or entropy decoded at an entropy decoding unit 308. Coding mode and/or prediction information may be sent to a spatial prediction unit 360 (e.g., if intra coded) and/or to a temporal prediction unit 362 (e.g., if inter coded). A prediction block may be formed the spatial prediction unit 360 and/or temporal prediction unit 362. Residual transform coefficients may be sent to an inverse quantization unit 310 and an inverse transform unit 312 to reconstruct a residual block. The prediction block and residual block may be added at 326. The reconstructed block may go through in-loop filtering 366 and may be stored in a reference picture store 364. Reconstructed videos in the reference picture store 364 may be used to drive a display device and/or to predict future video blocks.

One or more coding modules, for example, the ones associated with inter prediction, may be enhanced to improve inter coding efficiency. One or more inter coding tools may be described herein.

Combined inter and intra prediction may be performed.

As shown in FIGS. 1 and 3, inter prediction and intra prediction may be used to exploit temporal and spatial redundancy that exist in a video signal. In examples, a PU may exploit the correlation of an original video in either the temporal domain or spatial domain. Considering the characteristics of inter and intra predictions, such scheme may not be optimal for certain video content. For example, for video areas with old objects and new emerging objects mixed, a better coding efficiency may be expected, e.g., if there is a way to combine the inter and intra predictions together. Based on such consideration, a combined inter and intra prediction tool may be performed. The combined inter and intra prediction tool may combine an intra prediction with an inter prediction that is generated from merge mode. In examples, for each CU that is coded in merge mode, a flag may be signaled to indicate whether the combined inter and intra mode is applied or not. When the flag is true, additional syntaxes may be signaled, for example, to select an intra mode from a pre-defined intra mode candidate list. For luma components, the intra mode candidates may include 4-frequently selected intra modes, e.g., planar, DC, horizontal and vertical. For the chroma components, DM mode (e.g., indicating that the chroma components reuse the luma intra mode to generate their prediction samples) may be applied without any signaling. Weights may be applied to combine the inter prediction samples and the intra prediction samples. One or more of the following may apply.

For the CUs that are predicted by DC or planar mode and the CUs with a width or height being smaller or equal to 4, equal weights, e.g., 0.5, may be applied.

Figure 4:
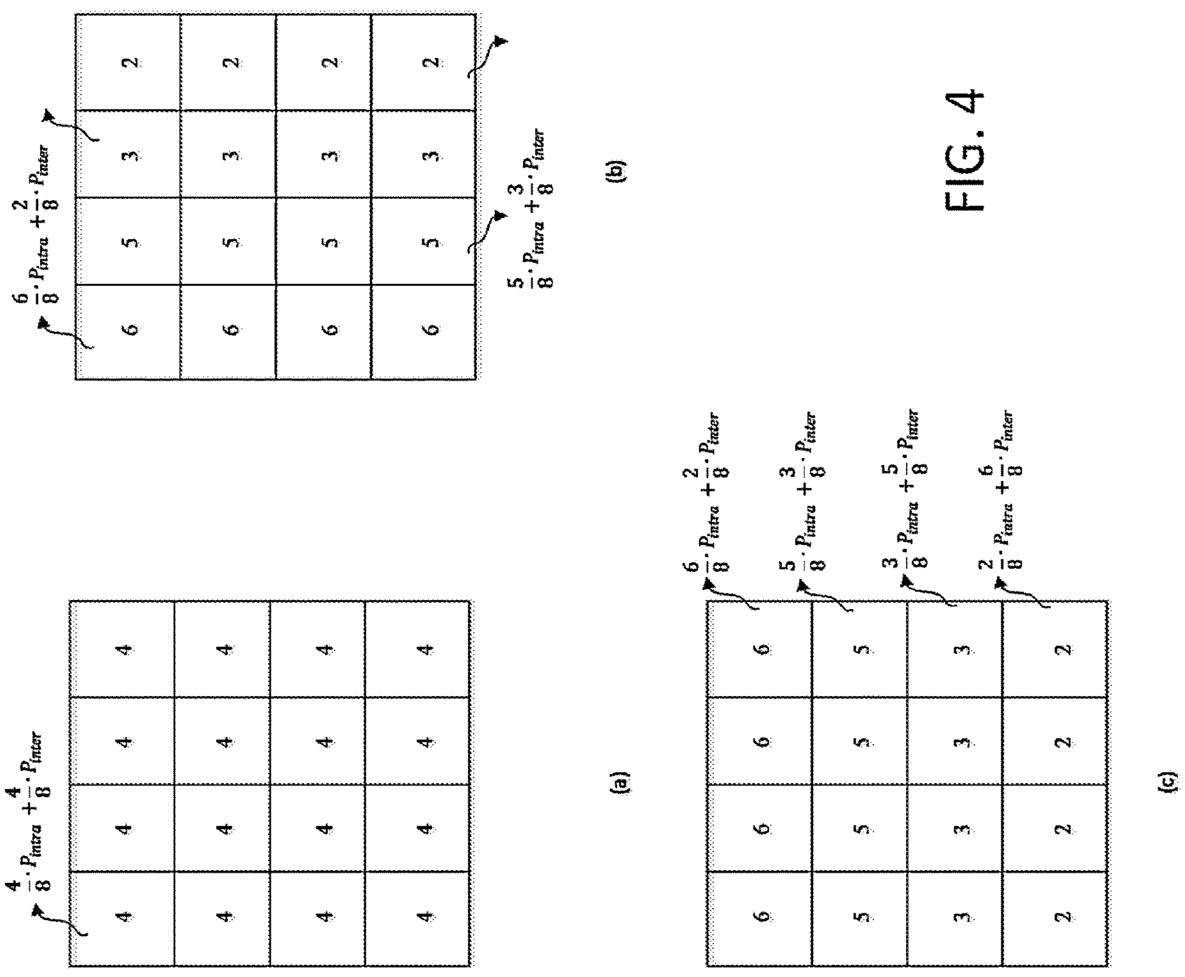
FIG. 4A illustrates an example associated with combined inter and intra prediction, and DC planar modes.
FIG. 4B illustrates an example associated with combined inter and intra prediction, and horizontal mode.
FIG. 4C illustrates an example associated with combined inter and intra prediction, and vertical mode.

If a CU is predicted by either horizontal or vertical mode and the CU is larger than 4 samples in width and height, the CU may be split in a horizontal or a vertical direction (e.g., depending on the intra mode that is applied); the split may be into four equal-size areas. A weight combination, denoted as ($w\_intra_i$, $w\_inter_i$), where i=0, . . . , 3. In examples, ($w\_intra_0$, $w\_inter_0$)=(0.75, 0.25), ($w\_intra_1$, $w\_inter_1$)=(0.625, 0.375), ($w\_intra_2$, $w\_inter_2$)=(0.375, 0.625) and ($w\_intra_3$, $w\_inter_3$)=(0.25, 0.75), where ($w\_intra_0$, $w\_inter_0$) may correspond to the region that is closest to the reconstructed neighboring samples (e.g., intra reference samples) and ($w\_intra_3$, $w\_inter_3$) may correspond to the region that is farthest away from the reconstructed neighboring samples. FIG. 4 illustrates exemplary weights that may be applied to combine the inter and intra prediction samples for the combined inter and intra prediction mode. For example, (a) illustrates example weights that may be applied in DC and/or planar modes; (b) illustrates example weights that may be applied in a horizontal mode; and (c) illustrates example weights that may be applied in a vertical mode. Table 1 shows an example coding unit syntax table after incorporating additional syntax elements for combined inter and intra prediction

TABLE 1

<table>
<tr><th colspan="2">coding unit syntax with combined inter and intra prediction.</th></tr>
<tr><th></th><th>Descriptor</th></tr>
<tr><td>coding_unit( x0, y0, cbWidth, cbHeight, treeType ) {</td><td></td></tr>
<tr><td>. . .</td><td></td></tr>
<tr><td>  if( cu_skip_flag[ x0 ][ y0 ] ) {</td><td></td></tr>
<tr><td>. . .</td><td></td></tr>
<tr><td>  } else {</td><td></td></tr>
<tr><td>    merge_flag[ x0 ][ y0 ]</td><td>ae(v)</td></tr>
<tr><td>    if( merge_flag[ x0 ][ y0 ] ) {</td><td></td></tr>
<tr><td>      if( sps_affine_enabled_flag && cbWidth >= 8 && cbHeight >= 8 &&</td><td></td></tr>
<tr><td>          (MotionModelIdc[ x0 − 1 ][ y0 + cbHeight − 1 ] != 0 ||</td><td></td></tr>
<tr><td>            Motion ModelIdc[ x0 − 1 ][ y0 + cbHeight ] != 0 ||</td><td></td></tr>
<tr><td>            MotionModelIdc[ x0 − 1 ][ y0 − 1 ] != 0 ||</td><td></td></tr>
<tr><td>            MotionModelIdc[ x0 + cbWidth − 1 ][ y0 − 1 ] != 0 ||</td><td></td></tr>
<tr><td>            MotionModelIdc[ x0 + cbWidth ][ y0 − 1 ]] != 0 ) )</td><td></td></tr>
<tr><td>          merge_affine_flag[ x0 ][ y0 ]</td><td>ae(v)</td></tr>
<tr><td>        if( merge_affine_flag[ x0 ][ y0 ] = = 0 && cbWidth >= 8 &&<br>        cbHeight >=<br>8 && cbWidth < 128 && cbHeight < 128)</td><td></td></tr>
<tr><td>            mh_intra_flag[ x0 ][ y0 ]</td><td>ae(v)</td></tr>
<tr><td>        if( mh_intra_flag[ x0 ][ y0 ] ) {</td><td></td></tr>
<tr><td>          mh_intra_luma_mpm_flag[ x0 ][ y0 ]</td><td>ae(v)</td></tr>
<tr><td>          if( mh_intra_luma_mpm_flag[ x0 ][ y0 ] )</td><td></td></tr>
<tr><td>              mh_intra_luma_mpm_idx[ x0 ][ y0 ]</td><td>ae(v)</td></tr>
<tr><td>        }</td><td></td></tr>
<tr><td>      if( merge_affine_flag[ x0 ][ y0 ] == 0 && MaxNumMergeCand > 1 )</td><td></td></tr>
<tr><td>          merge_idx[ x0 ][ y0 ]</td><td>ae(v)</td></tr>
<tr><td>    }</td><td></td></tr>
<tr><td>  }</td><td></td></tr>
<tr><td>. . .</td><td></td></tr>
<tr><td>}</td><td></td></tr>
</table>

Referring to Table 1, one or more of the following may apply. mh_intra_flag[x0][y0] may indicate whether combined inter and intra prediction for the current coding unit is applied. When mh_intra_flag[x0][y0] is not present, it may be inferred to be equal to 0. mh_intra_luma_mpm_flag[x0][y0] and mh_intra_luma_mpm_idx[x0][y0] may indicate the intra prediction mode for luma samples, for example, by invoking the derivation process for luma intra prediction mode for mh intra mode with the sample location (x0, y0), the width of the current coding block, the height of the current coding block, mh_intra_luma_mpm_flag[x0][y0], and mh_intra_luma_mpm_idx[x0][y0] as inputs.

The combined inter and intra prediction mode may be enabled, for example, when the current CU is coded by a conventional merge mode, e.g., five spatial and two temporal neighbors as that are used for the merge mode of the HEVC. For the inter CUs that signal the MVs in a bitstream or the inter CUs that are coded in other merge modes (e.g., affine merge, ATMVP, MMVD and triangle prediction), the combined inter and intra prediction may be disabled.

Sub-block merge mode may be performed.

A CU (e.g., each CU) that is coded by merge mode may have a set of motion parameters (e.g., one motion vector and one reference picture index) for a prediction direction (e.g., each prediction direction). One or more merge candidates that enable the derivation of motion information at sub-block level may be included in the merge mode. A category of sub-block merge candidates may include alternative temporal motion vector prediction (ATMVP). ATMVP may be built upon the same concept of the temporal motion vector prediction (TMVP) tool, and may allow a CU to fetch the motion information of its sub-blocks from multiple small blocks from its temporal neighboring picture (e.g., collocated reference picture). A category of sub-block merge candidates may include affine merge mode, which may model the motion of sub-blocks inside a CU based on affine model.

ATMVP may be performed.

In ATMVP, the temporal motion vector prediction may be improved, for example, by allowing a block to derive motion information (e.g., multiple motion information, including motion vector and reference indices) for the sub-blocks in a current block. Motion information for a sub block (e.g., each sub-block) may be derived from the corresponding small blocks of the temporally neighboring pictures of a current picture.

ATMVP may derive the motion information of sub-blocks of a block. One or more of following may apply. The corresponding block of the current block (e.g., which may be called a collocated block) may be identified in a selected temporal reference picture. The current block may be split into sub-blocks and the motion information of each sub-block may be derived from the corresponding small block in the collocated picture, for example, as shown in FIG. 5.

Figure 5:
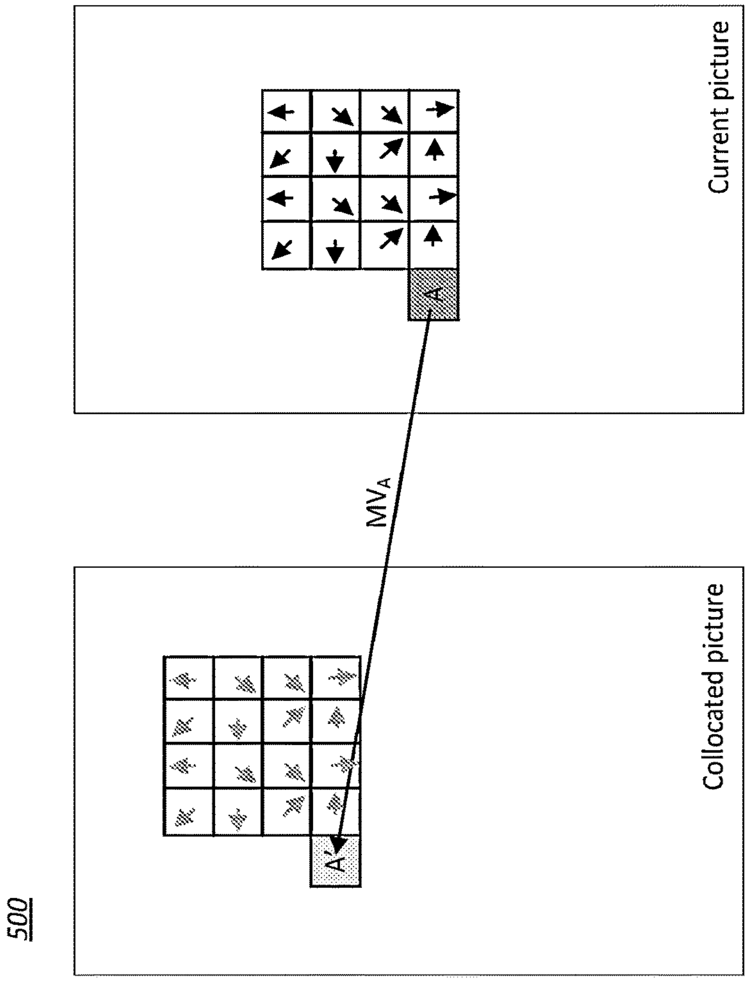
FIG. 5 illustrates an example associated with alternative temporal motion vector prediction.

FIG. 5 depicts an example sub-block motion information derivation 500. The current block may be split into sub-blocks and the motion information of each sub-block may be derived from the corresponding small block in the collocated picture, for example, as shown in FIG. 5. The selected temporal reference picture may be called a collocated picture. One or more of the following may apply. The collocated block and the collocated picture may be identified by the motion information of the spatial neighboring blocks of the current block. FIG. 5 illustrates an example associated with ATMVP. Referring to FIG. 5, block A may be identified as the first available merge candidate in the merge candidate list of a current block. The corresponding motion vector of block A (e.g., MVA) and its reference index may be used to identify the collocated picture and the collocated block. The location of the collocated block in the collocated picture may be determined by adding the motion vector of block A (MVA) to the coordinates of the current block.

The current block may be split into sub-blocks and the motion information of each sub-block may be derived from the corresponding small block in the collocated picture, for example, as shown in FIG. 5. In examples, the motion information for each sub-block in the current block may be derived from its corresponding small block in the collocated block (e.g., as indicated by red arrows in FIG. 5). The motion information of the small block (e.g., each small block in the collocated block) may be identified and converted to the motion vector and reference index of the corresponding sub-block in a current block (e.g., in a similar manner as the TMVP in HEVC where temporal motion vector scaling may be applied).

Figure 6:
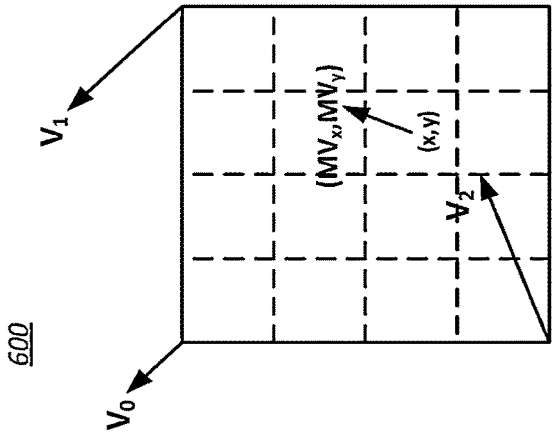
FIG. 6 illustrates an example associated with affine motion field modeling.

An affine model may be used to indicate motion information. There may be one or more types of motion present in a video sequence, e.g. one or more of the following: translational motion, zoom in/out, rotation, perspective motions, or other irregular motions. Motion compensation prediction based on affine motion field modeling may be applied. FIG. 6 illustrates an example of affine motion field modeling 600. As shown in FIG. 6, the affine motion field of the block may be described by one or more, e.g., three, control-point motion vectors. Based on three control-point motion, the motion field of one affine block may be described as $$MV_x = v_{0x} + (v_{1x} - v_{0x}) * \frac{x}{w} + (v_{2x} - v_{0x}) * \frac{y}{h} \qquad (1)$$
$$MV_y = v_{0y} + (v_{1y} - v_{0y}) * \frac{x}{w} + (v_{2y} - v_{0y}) * \frac{y}{h}$$

Motion vector ($v_{0x}$, $v_{0y}$) may be a motion vector of the top-left corner control point, and motion vector ($v_{1x}$, $v_{1y}$) may be a motion vector of the top-right corner control point. When one video block is coded by affine mode, its motion field may be derived based on the granularity of 4×4 block. To derive the motion vector of each 4×4 block, the motion vector of the center sample of each 4×4 sub-block may be calculated according to (1). It may be rounded to 1/16-pel accuracy. The derived motion vectors may be used at the motion compensation stage to generate the prediction signal of each sub-block inside the current block.

Figure 7:
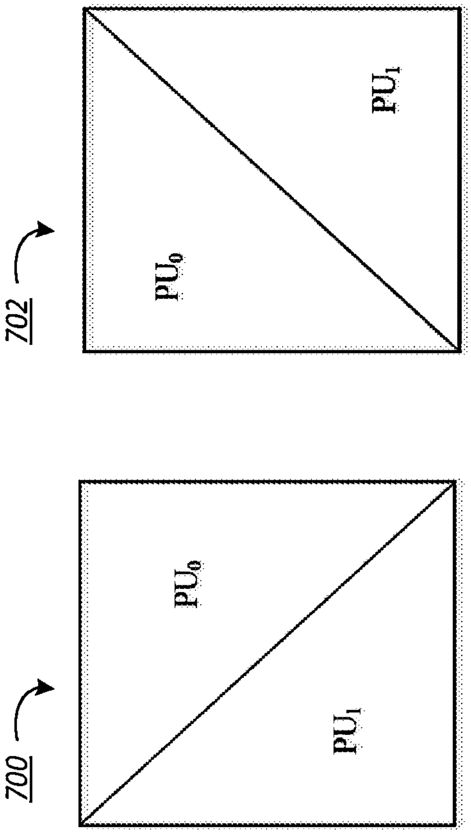
FIG. 7 depicts example triangular prediction partitions 700, 702.

Triangle inter prediction may be performed. FIG. 7 depicts example triangular prediction partitions 700, 702.

In some content (e.g., nature video content), the boundaries between two moving objects may not be horizontal or vertical (e.g., purely horizontal or vertical), which may be difficult to accurately approximate by rectangular blocks. Triangular prediction may be applied, e.g., to enable triangular partitions for motion compensated prediction. As shown in FIG. 7, triangular prediction may split a CU into one or more (e.g., two) triangular prediction units, e.g., in a diagonal or an inverse-diagonal direction. A triangular prediction unit (e.g., each triangular prediction unit in the CU) may be inter-predicted using its own uni-prediction motion vector and reference frame index, which may be derived from a uni-prediction candidate list.

Figure 8:
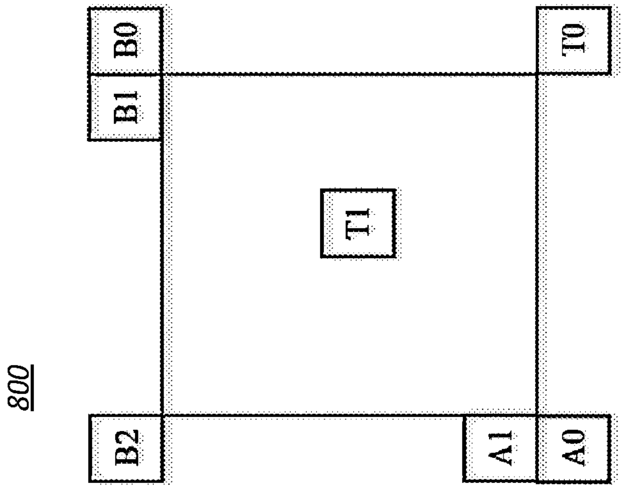
FIG. 8 illustrates an example associated with generating the uni-prediction motion vectors (MVs) in triangle mode.

FIG. 8 depicts an example uni-prediction motion vector candidate derivation 800. A uni-prediction candidate list may include one or more (e.g., five) uni-prediction motion vector candidates. Uni-prediction motion vector candidates may be derived from similar (e.g., the same) spatial/temporal neighboring blocks as those that are used for a merge process (e.g., the merge process of the HEVC). In examples, uni-prediction MV candidates may be derived from five spatially neighboring blocks and two temporally collocated blocks as shown in FIG. 8. Referring to FIG. 8, the motion vectors of the seven neighboring blocks may be collected and put into the uni-prediction MV candidate list in the order of: the L0 motion vector of neighboring blocks, the L1 motion vector of neighboring blocks, and the averaged motion vector of the L0 and L1 motion vectors of the neighboring blocks (e.g., if the neighboring blocks are bi-predicted). If the number of MV candidates is less than five, zero (0) motion vectors are added to the MV candidate list.

Cross-component prediction for chroma intra prediction may be performed. A correlation between the luma and chroma components of certain video content (e.g., nature video content) may exist. A cross-component linear model (CCLM) prediction mode may be used for chroma intra prediction. In the CCLM prediction mode, chroma samples may be predicted from reconstructed luma samples of a block (e.g., the same block) by using a linear model, e.g., (2).

$$pred_C(i, j) = \alpha \cdot rec_L(i, j) + \beta \qquad (2)$$

Referring to (2), $pred_C$(i,j) may indicate the prediction of chroma samples in a block and $rec_L$(i,j) may indicate the reconstructed luma samples of the same block in the same resolution as chroma block, which may be down sampled for 4:2:0 chroma format content. Parameters a and B may indicate the scaling parameter and the offset of the linear model, respectively.

As described herein, for a luma component, one or more (e.g., up to four frequently-used) intra modes, e.g., including planar, DC, horizontal, and vertical mode, may be supported (e.g., by the combined inter and intra prediction mode). A coding device (e.g., an encoder) may examine a plurality of intra modes. The coding device may select the intra mode of the plurality of intra modes that provides the best performance (e.g., in terms of rate-distortion tradeoff). The coding device may signal (e.g., explicitly signaled to the decoder) the selected intra mode. For combined inter and intra prediction mode, a non-negligible (e.g., significant) amount of bit-rate may be spent on the coding of the intra modes. In examples, due to the increases in computational capability, modern devices (e.g., even a battery-powered device, such as a wireless mobile device equipped with a decoder) may perform some sophisticated operations. An intra mode that is used for the combined inter and intra prediction at decoder side may be derived. If the decoder side derivation is accurate, signaling of an intra mode may be skipped and coding efficiency may be improved.

Combined inter and intra prediction may be enabled when a CU is coded by a merge mode. A merge mode may include using five spatial and two temporal neighbors for the merge mode (e.g., as shown in FIG. 8). For inter CUs that are predicted by other merge modes (e.g., affine merge, ATMVP, MMVD and triangle prediction), the combined inter and intra prediction may be (e.g., may always be) disabled. Combined inter and intra prediction for MMVD may be disabled, for example, because MMVD mode is mostly selected in the true bi-prediction scenario (e.g., where there are forward and backward predictions from reference lists L0 and L1). Motion-compensated prediction (e.g., the inter prediction) may be accurate to predict the current CU. Additional intra prediction may be unnecessary. Combined inter and intra prediction may not be disabled for other merge modes. For one or more merge modes (e.g., ATMVP and triangle prediction mode), sub-block motions that are derived from the spatial neighbors in the same reference picture or the collocated blocks in temporal reference picture may not be accurate. In those cases, it may be beneficial (e.g., in terms of coding performance) to enable the combination of the combined inter and intra prediction with those merge modes.

The coding performance of the combined inter and intra prediction mode may be improved. Intra mode derivation may skip the overhead of signaling intra mode, for example, by harnessing the computational capacity of a coding device (e.g., a decoder). The chroma coding for the combined inter and intra prediction mode may be improved. The application of combined inter and intra prediction mode may be extended with one or more coding tools, for example, including triangle inter prediction and/or sub-block merge mode.

Combined inter and intra prediction may be performed, for example, with decoder intra mode derivation. In combined inter and intra prediction, for example, the selected intra mode of a luma component (e.g., planar, DC, horizontal or vertical mode) may be signaled to and/or from a coding device (e.g., encoder or decoder). Signaling the selected intra mode may take up a non-negligible portion of the bitstream (e.g., output bit-steam) and/or may reduce the overall coding performance. The intra mode that is used for the combined inter and intra prediction may be derived at a coding device (e.g., decoder), which may reduce overhead. Stated differently, the decoder may derive (e.g., based on one or more neighboring reconstructed samples) an intra mode for a combined inter and intra prediction. When combined inter and intra prediction is applied to a CU (e.g., instead of directly signaling the intra mode in the bit-stream) the intra mode may be derived, for example, from the neighboring reconstructed samples of the CU.

Figure 9:
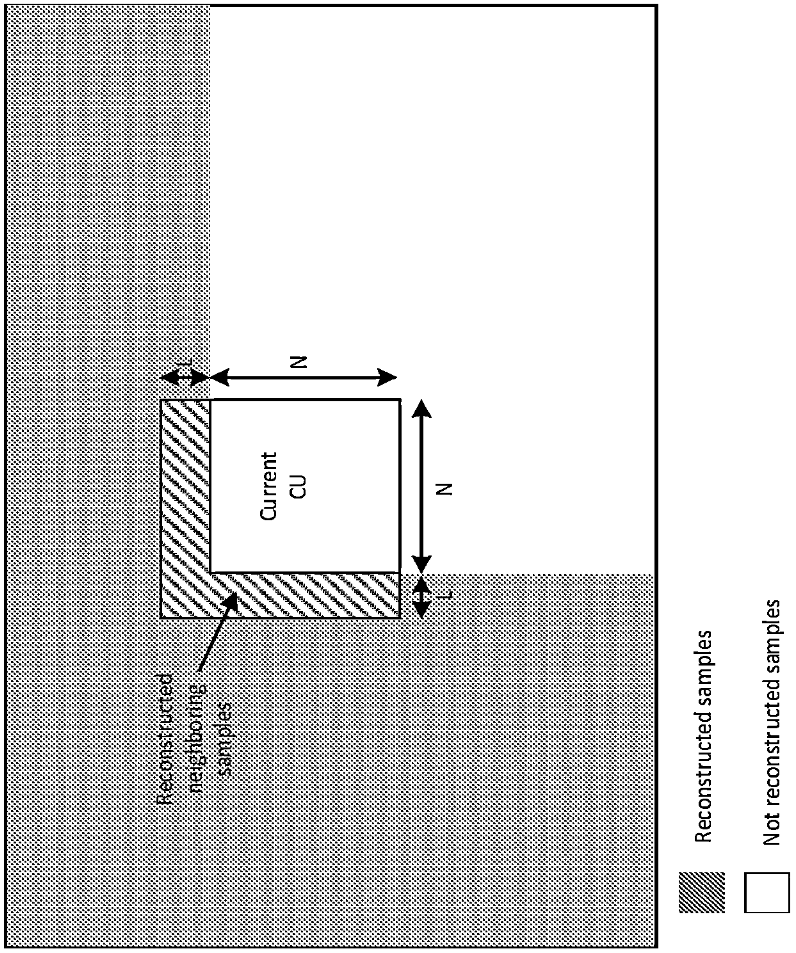
FIG. 9 illustrates an example associated with intra mode derivation.

FIG. 9 illustrates an example intra mode derivation 900 (e.g., decoder-side derivation of the intra mode for the combined inter and intra mode). As shown in FIG. 9, a current CU for which the combined inter and intra mode is applied may include a size of N×N (width×height). A template may specify a set of reconstructed samples that are used to derive the intra mode of the current CU. The shaded region in FIG. 9 may represent a template. The template size may be denoted as the number of samples within an L-shape region that extends to the top and the left of a target block, e.g., L. A gradient analysis may be applied on top of the template samples, for example, when there is a strong correlation between the samples of the current CU and its neighboring blocks (e.g., template). The gradient analysis may be used to estimate the intra mode used for the combined inter and intra prediction of the current CU. In examples, as shown in (3), a 3×3 Sobel filter may be applied to calculate the horizontal and vertical gradient of the samples in the template.

$$M_x = \begin{bmatrix} -1 & 0 & 1 \\ -2 & 0 & 2 \\ -1 & 0 & 1 \end{bmatrix}, M_y = \begin{bmatrix} -1 & -2 & -1 \\ 0 & 0 & 0 \\ 1 & 2 & 1 \end{bmatrix} \quad (3)$$

The two matrices (e.g., $M_x$ and $M_y$) may be multiplied with 3×3 window of samples (e.g., sample centered at a template sample). Two gradient values, $G_x$ and $G_y$, and an activity value $Act_h$ may be calculated by summing up the horizontal and vertical gradients at each template sample, e.g., using (4).

$$G_x = \sum_{(i,j)\in\Omega} M_x^{(i,j)},\ G_y = \sum_{(i,j)\in\Omega} M_y^{(i,j)} \quad (4)$$

$$\text{Act}_b = \sum_{(i,j)\in\Omega} \left(\left|M_x^{(i,j)}\right| + \left|M_y^{(i,j)}\right|\right)$$

Figure 10:
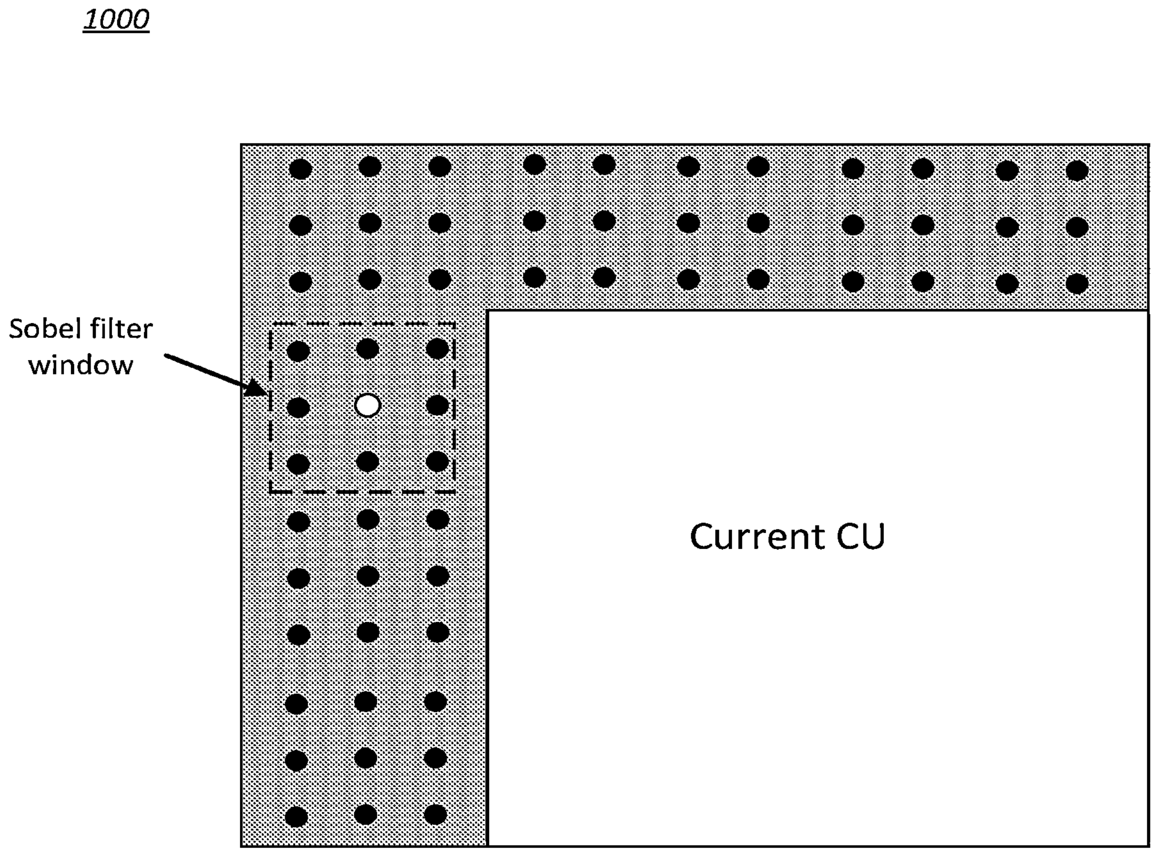
FIG. 10 illustrates an example associated with a gradient calculation of the template samples for intra mode derivation.

Referring to (4), $$M_x^{(i,j)} \text{ and } M_y^{(i,j)}$$

may indicate the horizontal and vertical gradients of the template sample at coordinate (i,j), respectively. Ω may indicate the set of the coordinates of the samples in the template. FIG. 10 illustrates an example gradient calculation 1000 of the template samples for intra mode derivation. Given the gradient and activity values calculated in (4), the final intra mode (e.g., the final intra mode applied to the current CU) may be determined by (5).

$$Dir_{intra} = \begin{cases} Hor, \text{ if } G_y \geq th_g \cdot G_x \\ Ver, \text{ if } G_x \geq th_g \cdot G_y \\ \text{DC, if } \frac{1}{th_g} < \frac{G_x}{G_y} < th_g, \text{Act}_b < th_{act} \\ \text{Planar, otherwise} \end{cases} \quad (5)$$

Referring to (5), $th_g$ and $th_{act}$ may indicate two predefined thresholds for gradient and activity values, which may be fixed and used at a coding device (e.g., an encoder and/or decoder). In examples, the thresholds for gradient and activity values may be determined by a coding device (e.g., encoder) and signaled in bitstream to another coding device (e.g., decoder).

In FIG. 9, reconstructed samples (e.g., the closest reconstructed samples to the current CU) that form an L-shaped region, may be used as a template. In examples, templates with different shapes and/or sizes may be selected, which may provide different complexity/performance trade-offs. When choosing a large template size, the samples of the template may be far away from a target block. The correlation between the template and the target block may be insufficient. A large template size may increase encoding and decoding complexity (e.g., given that more samples may be considered for gradient and activity calculation). A large template size may yield a reliable estimation when noise is present. In examples, an adaptive template size may be used for intra mode estimation. For example, the template size may be determined based on a CU size. The template size may be represented in FIG. 9 by the value of "L." In examples, a first template size may be used for certain CU sizes (e.g., less than 64 samples) and a second template size may be used for other CU sizes (e.g., CUs with greater than or equal to 64 samples). The first template size may be 3 (e.g., L=3 as shown in FIG. 9). The second template size may be 5 (e.g., L=5 as shown in FIG. 9).

A decoder may select a luma intra mode for a combined inter and intra mode. The luma intra mode for the combined inter and intra mode may be selected, for example, by minimizing the difference between inter prediction samples and intra prediction samples. Luma intra mode for the combined inter and intra mode selection may include calculating the cost measured between the inter prediction signal and the intra prediction signal (e.g., for each intra prediction mode). One or more of the following cost measurements (e.g., template cost measurement) may be applied, such as, for example, the sum of absolute difference (SAD), the sum of square difference (SSD), and/or the sum of absolute transformed difference (SATD). Based on a comparison of the costs, the intra prediction mode that yields the minimum template cost may be selected as the intra prediction mode of the current CU (e.g., the optimal intra prediction mode of the current CU). In an example, the intra prediction mode associated with the lowest measured cost may be selected (e.g., by the decoder).

Combined inter and intra prediction may be performed with chroma CCLM mode. In combined inter and intra prediction, direct mode (DM) may be applied to one or more chroma components, for example, without signaling. In DM, a luma component intra mode may be reused for the one or more chroma components. An inter-channel correlation between luma and chroma components may exist. For example, luma components may have an inter-channel correlation with chroma components. Chroma components may have an inter-channel correlation with luma components. CCLM may be used for chroma intra prediction. For example, CCLM may be used for chroma intra prediction where the chroma samples are predicted from the corresponding luma samples with sub-sampling being applied based on a linear model. One or more CCLM model parameters may be derived from one or more neighboring luma and/or chroma samples (e.g., the casual neighboring luma and chroma samples around a current CU). DM mode may be replaced with CCLM mode for the intra prediction of chroma samples, for example, when the combined inter and intra prediction is applied to a CU. Stated differently, CCLM mode may be applied (e.g., instead of DM mode) to one or more chroma components.

CCLM mode may be applied to chroma components in one or more of the following ways. In examples, one or more luma prediction samples of a CU may be generated by blending prediction samples that are generated from intra prediction (e.g., based on the intra mode that is signaled in the bitstream) and inter prediction (e.g., based on the MV of the neighboring block indicated by a merge index). The one or more luma prediction samples and the residual samples of the luma component may be added together, for example, to generate (e.g., form) one or more reconstructed luma samples. The one or more reconstructed luma samples may be sub-sampled. The one or more reconstructed luma samples may be used to generate one or more chroma prediction samples based on the CCLM mode.

In examples, the one or more chroma prediction samples (e.g., CCLM prediction samples) may be combined with chroma inter prediction samples, for example, to generate the final prediction samples for the chroma components. The one or more chroma prediction samples may be referred to as chroma intra prediction samples.

Figure 11:
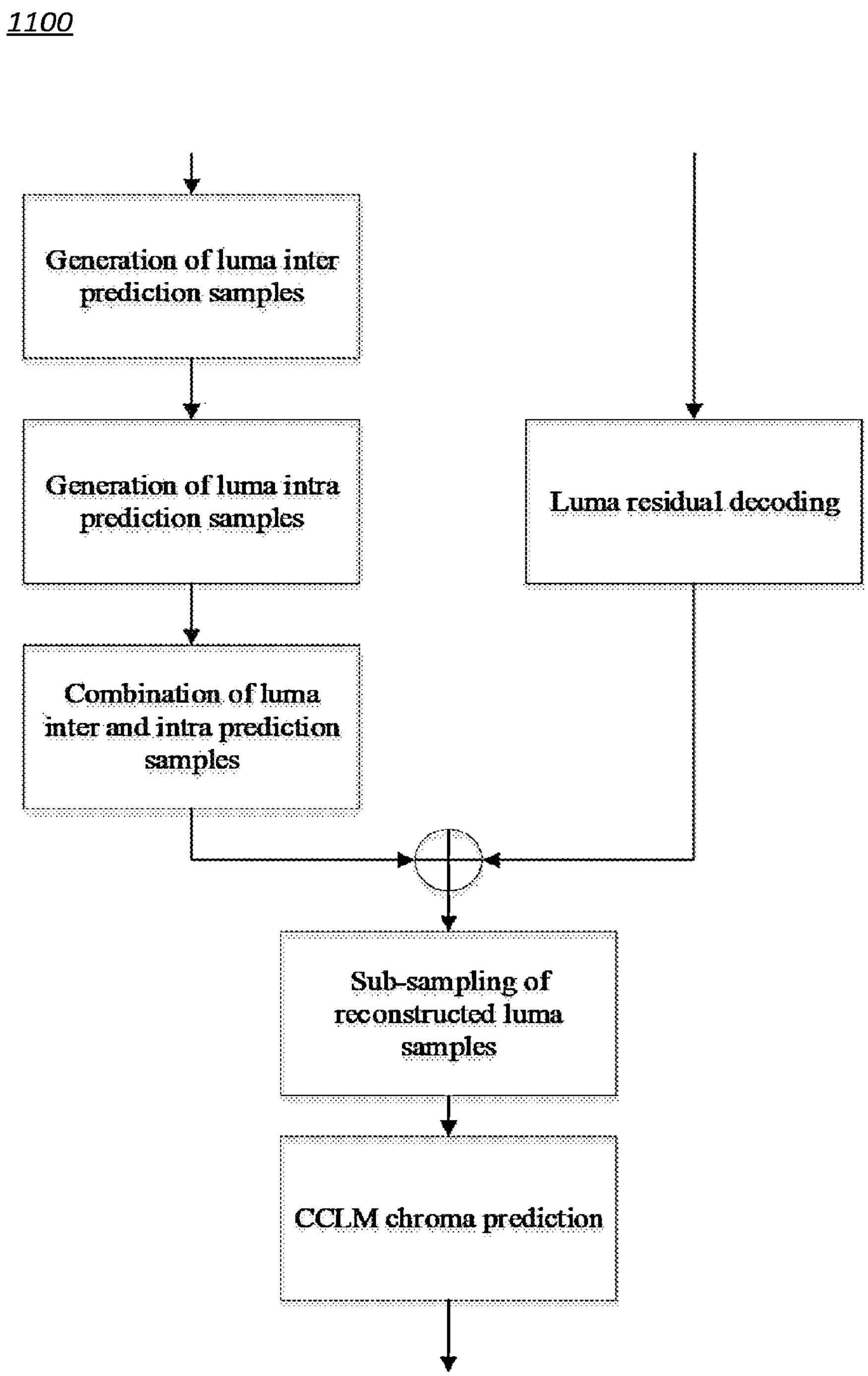
FIG. 11 illustrates an example associated with chroma prediction for combined inter and intra prediction using the cross-component linear model (CCLM) chroma prediction samples.

FIG. 11 illustrates an example chroma prediction 1100 for combined inter and intra prediction using (e.g., directly using) the CCLM chroma prediction samples. In a first example method (e.g., as shown in FIG. 11) of applying CCLM mode to chroma components, chroma LM prediction samples may be used directly.

Figure 12:
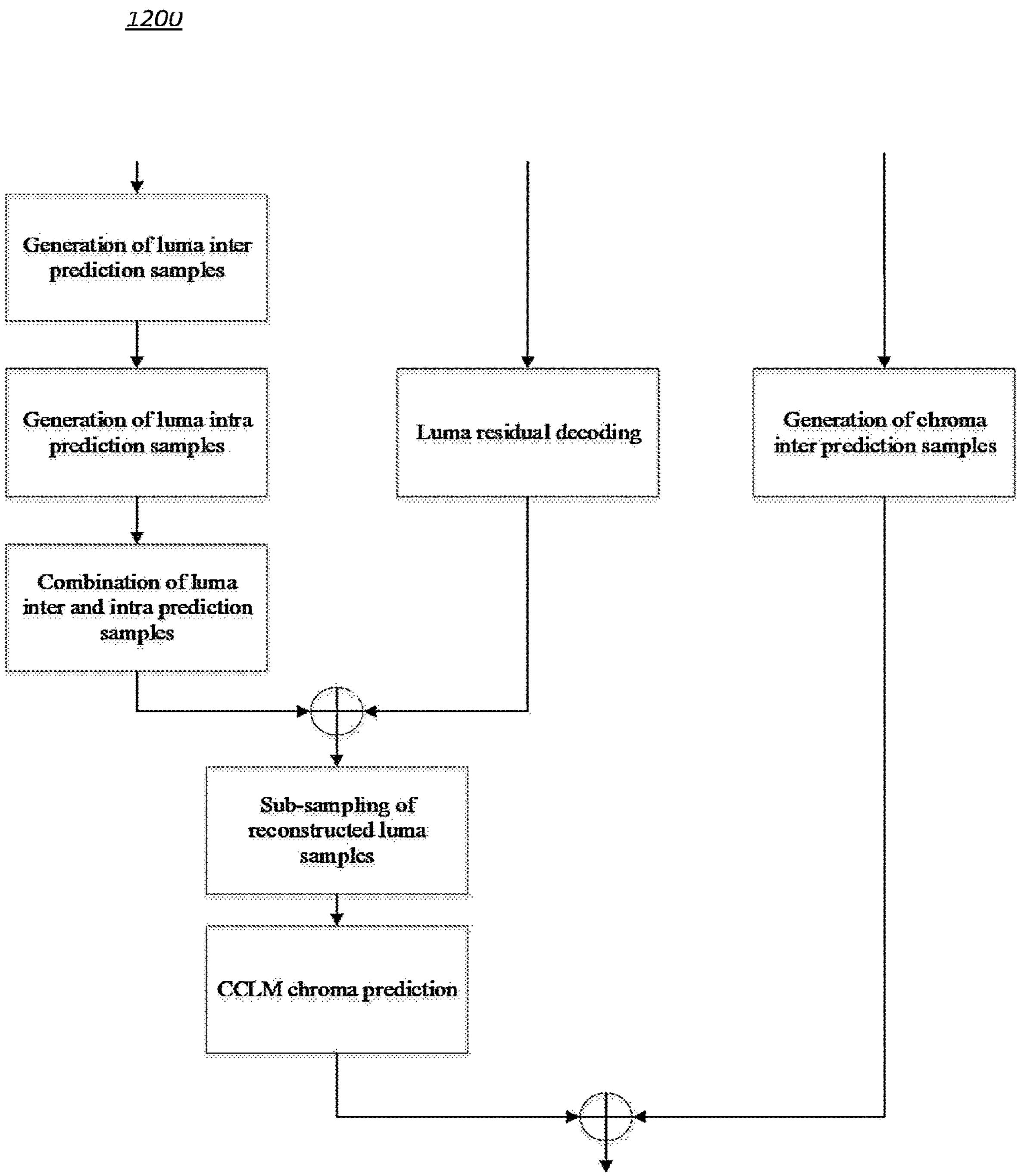
FIG. 12 illustrates an example associated with chroma prediction for combined inter and intra prediction by combining the chroma inter prediction samples and CCLM chroma prediction samples.

FIG. 12 illustrates an example chroma prediction 1200 for combined inter and intra prediction by combining the chroma inter prediction samples and CCLM chroma prediction samples. In a second example method (e.g., as shown in FIG. 12) of applying CCLM mode to chroma components, chroma intra prediction samples may be combined with chroma inter prediction samples.

DM and CCLM modes may be enabled for the chroma intra prediction of the combined inter and intra prediction. A flag may be signaled, for example, when the combined inter and intra prediction is enabled for a current CU. The flag may indicate whether DM mode or CCLM mode are applied. One or more of the following may apply. When the flag is set to true, DM mode may be applied to chroma components, e.g., such that the same intra mode of the luma component is reused to generate the chroma intra prediction samples. When the flag is set to false, CCLM mode may be applied to the intra prediction of chroma samples, e.g., the chroma intra predication samples will be generated from the sub-sampled luma reconstruction samples based on the linear mode.

The combined inter and intra prediction may interact with other coding tools. The combined inter and intra prediction may be enabled when a CU is coded by a merge mode (e.g., a conventional merge mode). The combined inter and intra prediction mode may interact with one or more other inter coding tools (e.g., including affine merge, ATMVP, and triangle prediction). The interaction(s) (e.g., the synergy of the interaction) between the combined inter and intra prediction mode and the one or more other inter coding tools may be improved. One or more of the following may apply.

The combined inter and intra prediction may be enabled for sub-block merge mode. Motion information may be derived at a sub-block level. For example, sub-block derivation of the motion information may be enabled through sub-block merge modes, e.g., ATMVP and affine mode. In examples, the combined inter and intra prediction may be disabled (e.g., for CUs that are predicted by the sub-block modes). The sub-block motion information may be derived (e.g., purely derived) from one or more spatial neighbors (e.g., in affine merge mode). The sub-block motion information may be derived from one or more temporal neighbors (e.g., in ATMVP mode). The sub-block motion information may not be accurate enough to generate prediction samples of a current CU. The combined inter and intra prediction for sub-block merge modes may be enabled. In examples, the combined inter and intra mode may be enabled (e.g., only enabled) for the ATMVP mode, and may be disabled (e.g., always disabled) for the affine merge mode. A combined inter and intra prediction flag may be signaled, for example, to enable the combined inter and intra prediction. The combined inter and intra prediction flag may be signaled after the sub-block merge index. When the sub-block merge index refers to an affine candidate, the combined inter and intra prediction flag may be skipped. When the sub-block merge index refers to an affine candidate, the combined inter and intra prediction flag may be inferred to be false, e.g., disabling the combined inter/intra prediction. If the sub-block merge index refers to an ATMVP candidate, the combined inter/intra flag may be signaled to indicate whether the combined inter and intra prediction is enabled for the current CU.

The combined inter and intra prediction may be enabled for triangle mode (e.g., triangle merge mode). In triangle prediction, a PU (e.g., each PU) in a current CU may be inter-predicted using an MV (e.g., motion vector candidate) from a uni-prediction candidate list for the current CU. The MV candidates in the uni-prediction candidate list may be derived from spatially and/or temporally neighboring blocks of a current CU, which may not be accurate enough to describe the motion of the CU. The combined inter and intra prediction may be for triangle prediction mode, for example, to improve the efficiency of triangle inter prediction. An intra prediction mode (e.g., a single intra prediction mode) may be signaled for one or more (e.g., two) PUs. An intra prediction mode may be signaled, e.g., for each PU separately.

Triangle mode may be disabled for the combined inter and intra prediction and/or MMVD mode. Triangle mode may be referred to as triangle merge mode. Triangle merge mode may be enabled when CIIP is not applied and MMVD mode is not used. For example, a video coding device (e.g., an encoder configured as shown in FIG. 1) may determine whether to enable triangle merge mode. When the encoder determines to enable triangle merge mode, the encoder may determine not to apply CIIP and not use MMVD mode. For example, the video coding device may enable the triangle merge mode without receiving a triangle merge mode indication (e.g., a triangle merge mode flag). A video coding device (e.g., a decoder configured as shown in FIG. 3) may receive a MMVD mode indication (e.g., a MMVD flag). For example, an encoder may send the MMVD mode indication to the video coding device. The video coding device may be a WTRU (e.g., such as WTRU 102 shown in FIGS. 13A-13D). The video coding device may include a WTRU (e.g., such as WTRU 102 shown in FIGS. 13A-13D). The MMVD mode indication may indicate whether MMVD mode is used to generate inter prediction of a CU. The MMVD mode indication may be received on a per coding unit basis. The video coding device may receive a combine inter merge/intra prediction (CIIP) indication (e.g., a CIIP flag). For example, an encoder may send the CIIP indication to the video coding device. The CIIP indication may not be received when the MMVD mode indication indicates that MMVD mode is used for the CU. The CIIP indication may indicate whether CIIP is applied for the CU.

In examples, the triangle merge flag may be signaled, for example, after the sub-block merge flag, the combined inter/intra flag, and/or MMVD flag. If one or more of the above flags are set to true, the triangle flag may not be signaled. When the CIIP indication indicates that CIIP is applied for the CU, the triangle merge flag may not be signaled. For example, an encoder may determine not to include a triangle merge flag in a message to the video coding device (e.g., decoder) when the CIIP indication indicates that CIIP is applied for the CU. When the MMVD mode indication indicates that MMVD mode is used to generate the inter prediction, the triangle merge flag may not be signaled. For example, an encoder may determine not to include a triangle merge flag in a message to the video coding device (e.g., decoder) when the MMVD mode indication indicates that MMVD mode is used to generate the inter prediction. When the triangle merge flag is not signaled, the triangle merge flag may be inferred as false (e.g., disabling the triangle mode). For example, the video coding device may infer whether to enable the triangle merge mode for the CU based on the MMVD mode indication and/or the CIIP indication. The video coding device may disable the triangle merge mode for the CU, for example, when the MMVD mode indication indicates that MMVD mode is used to generate the inter prediction. The video coding device may disable the triangle merge mode, for example, when the CIIP indication indicates that CIIP is applied for the CU. If the three flags are set to false, the triangle flag may be signaled, for example, to indicate whether the triangle mode is applied to the current CU.

Figure 13A:
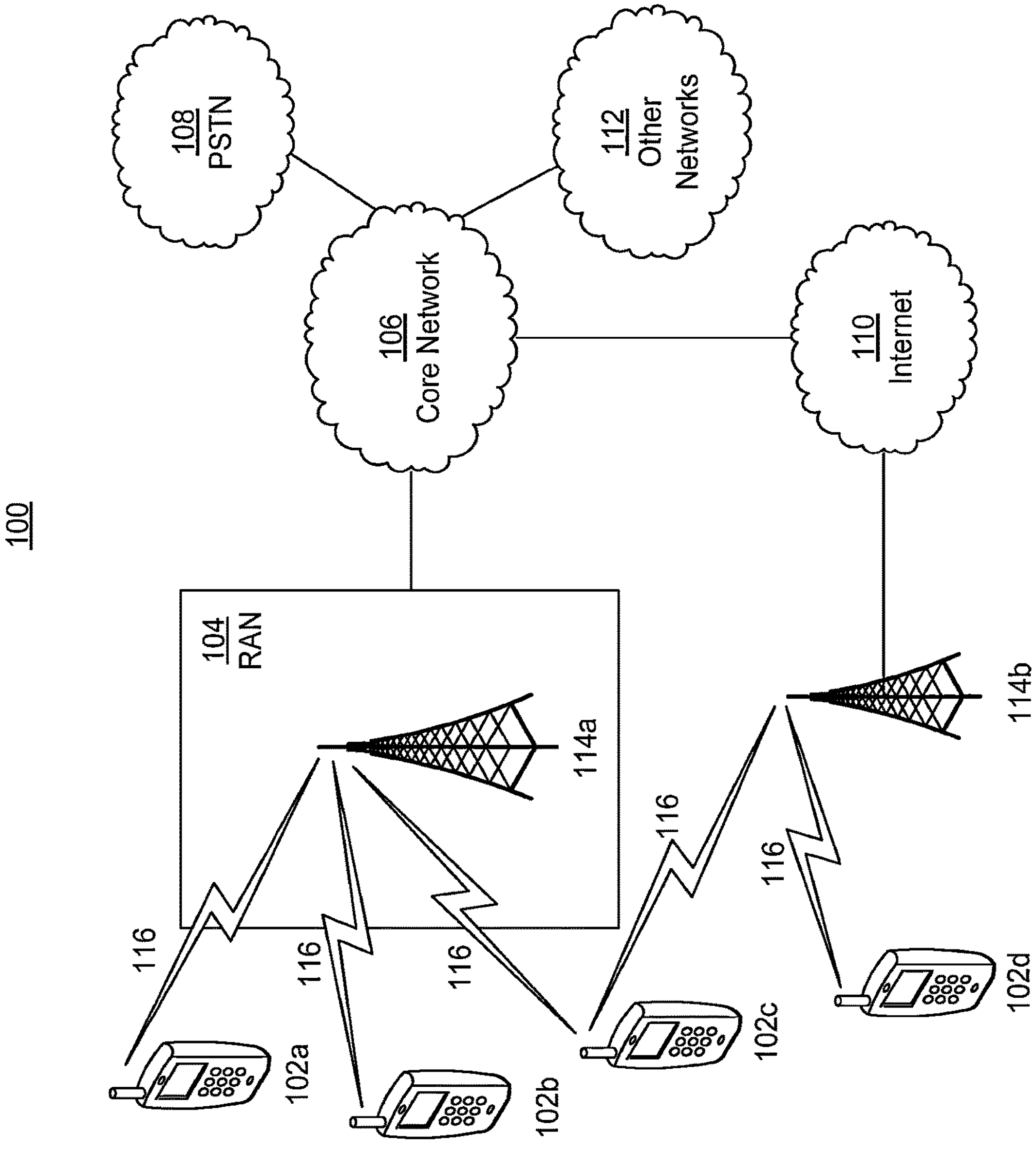
FIG. 13A is a system diagram of an example communications system in which one or more disclosed embodiments may be implemented.

FIG. 13A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 13A, the communications system 100 may include wireless transmit/receive units (WTRUs) 102*a*, 102*b*, 102*c*, 102*d*, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102*a*, 102*b*, 102*c*, 102*d* may be any type of device configured to operate and/or communicate in a wireless environment. By way of example, the WTRUs 102*a*, 102*b*, 102*c*, 102*d*, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102*a*, 102*b*, 102*c* and 102*d* may be interchangeably referred to as a UE.

The communications systems 100 may also include a base station 114*a* and/or a base station 114*b*. Each of the base stations 114*a*, 114*b* may be any type of device configured to wirelessly interface with at least one of the WTRUs 102*a*, 102*b*, 102*c*, 102*d* to facilitate access to one or more communication networks, such as the CN 106/115, the Internet 110, and/or the other networks 112. By way of example, the base stations 114*a*, 114*b* may be a base transceiver station (BTS), a Node-B, an eNode B, a Home Node B, a Home eNode B, a gNB, a NR NodeB, a site controller, an access point (AP), a wireless router, and the like. While the base stations 114*a*, 114*b* are each depicted as a single element, it will be appreciated that the base stations 114*a*, 114*b* may include any number of interconnected base stations and/or network elements.

The base station 114*a* may be part of the RAN 104/113, which may also include other base stations and/or network elements (not shown), such as a base station controller (BSC), a radio network controller (RNC), relay nodes, etc. The base station 114*a* and/or the base station 114*b* may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114*a* may be divided into three sectors. Thus, in one embodiment, the base station 114*a* may include three transceivers, i.e., one for each sector of the cell. In an embodiment, the base station 114*a* may employ multiple-input multiple output (MIMO) technology and may utilize multiple transceivers for each sector of the cell. For example, beamforming may be used to transmit and/or receive signals in desired spatial directions.

The base stations 114*a*, 114*b* may communicate with one or more of the WTRUs 102*a*, 102*b*, 102*c*, 102*d* over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114*a* in the RAN 104/113 and the WTRUs 102*a*, 102*b*, 102*c* may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114*a* and the WTRUs 102*a*, 102*b*, 102*c* may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114*a* and the WTRUs 102*a*, 102*b*, 102*c* may implement a radio technology such as NR Radio Access, which may establish the air interface 116 using New Radio (NR).

In an embodiment, the base station 114*a* and the WTRUs 102*a*, 102*b*, 102*c* may implement multiple radio access technologies. For example, the base station 114*a* and the WTRUs 102*a*, 102*b*, 102*c* may implement LTE radio access and NR radio access together, for instance using dual connectivity (DC) principles. Thus, the air interface utilized by WTRUs 102*a*, 102*b*, 102*c* may be characterized by multiple types of radio access technologies and/or transmissions sent to/from multiple types of base stations (e.g., an eNB and a gNB).

In other embodiments, the base station 114*a* and the WTRUs 102*a*, 102*b*, 102*c* may implement radio technologies such as IEEE 802.11 (i.e., Wireless Fidelity (WiFi), IEEE 802.16 (i.e., Worldwide Interoperability for Microwave Access (WiMAX), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114*b* in FIG. 13A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114*b* and the WTRUs 102*c*, 102*d* may implement a radio technology such as IEEE 802.11 to establish a wireless local area network (WLAN). In an embodiment, the base station 114*b* and the WTRUs 102*c*, 102*d* may implement a radio technology such as IEEE 802.15 to establish a wireless personal area network (WPAN). In yet another embodiment, the base station 114*b* and the WTRUs 102*c*, 102*d* may utilize a cellular-based RAT (e.g., WCDMA, CDMA2000, GSM, LTE, LTE-A, LTE-A Pro, NR etc.) to establish a picocell or femtocell. As shown in FIG. 13A, the base station 114*b* may have a direct connection to the Internet 110. Thus, the base station 114*b* may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102*a*, 102*b*, 102*c*, 102*d*. The data may have varying quality of service (QOS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 13A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102*a*, 102*b*, 102*c*, 102*d* to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102*a*, 102*b*, 102*c*, 102*d* in the communications system 100 may include multi-mode capabilities (e.g., the WTRUs 102*a*, 102*b*, 102*c*, 102*d* may include multiple transceivers for communicating with different wireless networks over different wireless links). For example, the WTRU 102*c* shown in FIG. 13A may be configured to communicate with the base station 114*a*, which may employ a cellular-based radio technology, and with the base station 114*b*, which may employ an IEEE 802 radio technology.

Figure 13B:
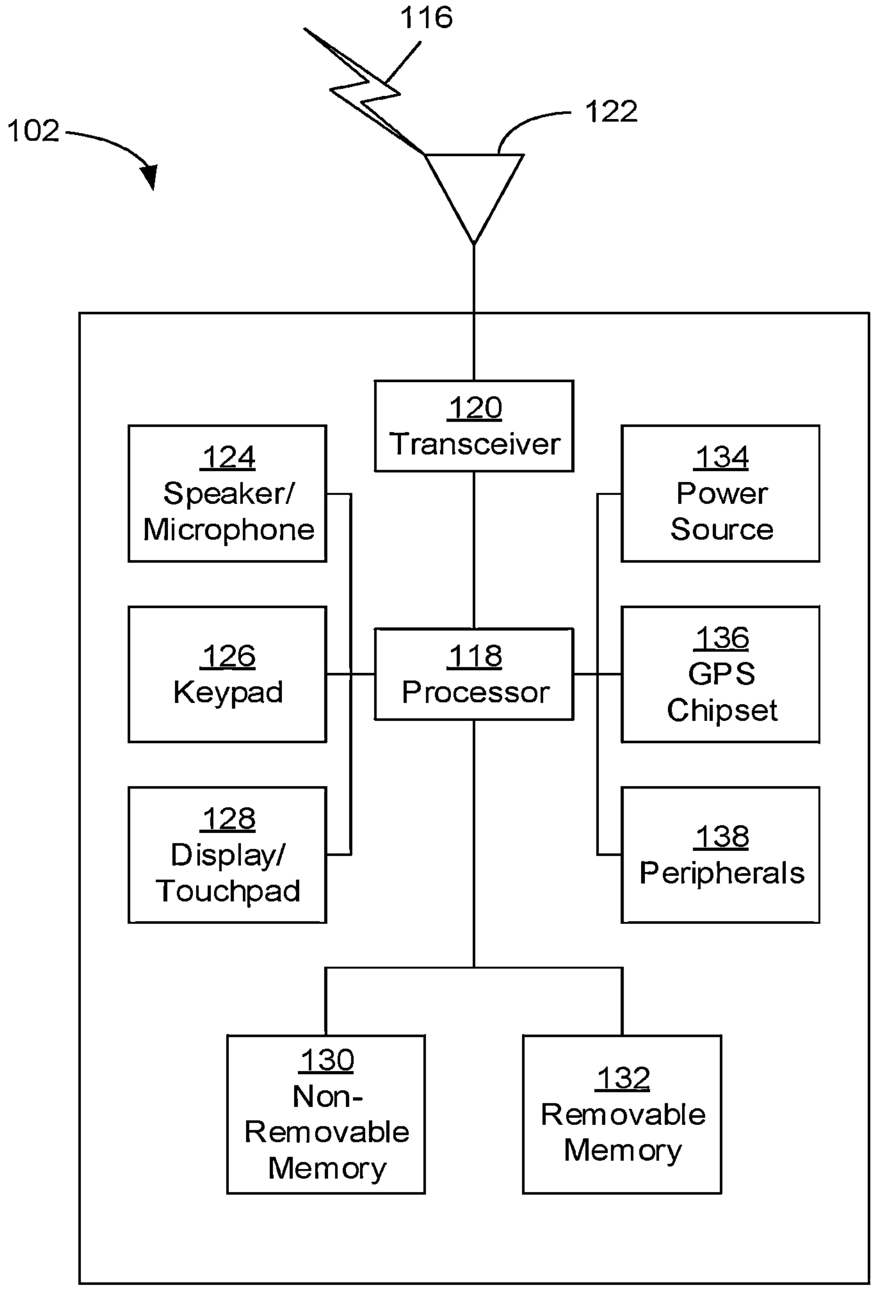
FIG. 13B is a system diagram of an example wireless transmit/receive unit (WTRU) that may be used within the communications system illustrated in FIG. 13A.

FIG. 13B is a system diagram illustrating an example WTRU 102. As shown in FIG. 13B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general-purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 13B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114*a*) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 13B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134 and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114*a*, 114*b*) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception).

Figure 13C:
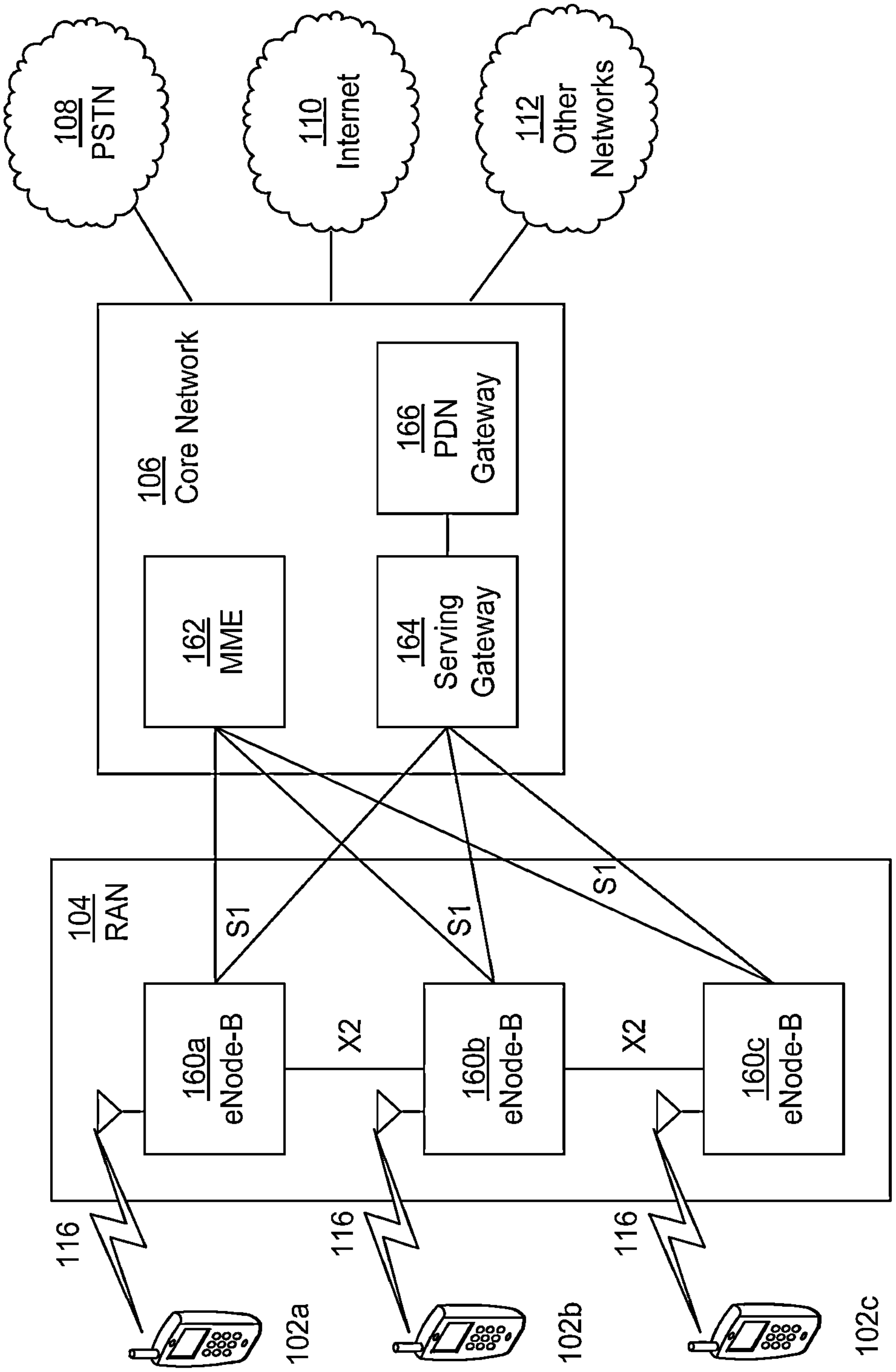
FIG. 13C is a system diagram of an example radio access network (RAN) and an example core network (CN) that may be used within the communications system illustrated in FIG. 13A.

FIG. 13C is a system diagram illustrating the RAN 104 and the CN 106 according to an embodiment. As noted above, the RAN 104 may employ an E-UTRA radio technology to communicate with the WTRUs 102*a*, 102*b*, 102*c* over the air interface 116. The RAN 104 may also be in communication with the CN 106.

The RAN 104 may include eNode-Bs 160*a*, 160*b*, 160*c*, though it will be appreciated that the RAN 104 may include any number of eNode-Bs while remaining consistent with an embodiment. The eNode-Bs 160*a*, 160*b*, 160*c* may each include one or more transceivers for communicating with the WTRUs 102*a*, 102*b*, 102*c* over the air interface 116. In one embodiment, the eNode-Bs 160*a*, 160*b*, 160*c* may implement MIMO technology. Thus, the eNode-B 160*a*, for example, may use multiple antennas to transmit wireless signals to, and/or receive wireless signals from, the WTRU 102*a*.

Each of the eNode-Bs 160*a*, 160*b*, 160*c* may be associated with a particular cell (not shown) and may be configured to handle radio resource management decisions, handover decisions, scheduling of users in the UL and/or DL, and the like. As shown in FIG. 13C, the eNode-Bs 160*a*, 160*b*, 160*c* may communicate with one another over an X2 interface.

The CN 106 shown in FIG. 13C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162*a*, 162*b*, 162*c* in the RAN 104 via an S1 interface and may serve as a control node. For example, the MME 162 may be responsible for authenticating users of the WTRUs 102*a*, 102*b*, 102*c*, bearer activation/deactivation, selecting a particular serving gateway during an initial attach of the WTRUs 102*a*, 102*b*, 102*c*, and the like. The MME 162 may provide a control plane function for switching between the RAN 104 and other RANs (not shown) that employ other radio technologies, such as GSM and/or WCDMA.

The SGW 164 may be connected to each of the eNode Bs 160*a*, 160*b*, 160*c* in the RAN 104 via the S1 interface. The SGW 164 may generally route and forward user data packets to/from the WTRUs 102*a*, 102*b*, 102*c*. The SGW 164 may perform other functions, such as anchoring user planes during inter-eNode B handovers, triggering paging when DL data is available for the WTRUs 102*a*, 102*b*, 102*c*, managing and storing contexts of the WTRUs 102*a*, 102*b*, 102*c*, and the like.

The SGW 164 may be connected to the PGW 166, which may provide the WTRUs 102*a*, 102*b*, 102*c* with access to packet-switched networks, such as the Internet 110, to facilitate communications between the WTRUs 102*a*, 102*b*, 102*c* and IP-enabled devices.

The CN 106 may facilitate communications with other networks. For example, the CN 106 may provide the WTRUs 102*a*, 102*b*, 102*c* with access to circuit-switched networks, such as the PSTN 108, to facilitate communications between the WTRUs 102*a*, 102*b*, 102*c* and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102*a*, 102*b*, 102*c* with access to the other networks 112, which may include other wired and/or wireless networks that are owned and/or operated by other service providers Although the WTRU is described in FIGS. 13A-13D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHZ, 80 MHz, and/or 160 MHz wide channels. The 40 MHZ, and/or 80 MHZ, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHZ, 2 MHZ, 4 MHZ, 8 MHZ, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHZ, 4 MHZ, 8 MHZ, 16 MHZ, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 13D:
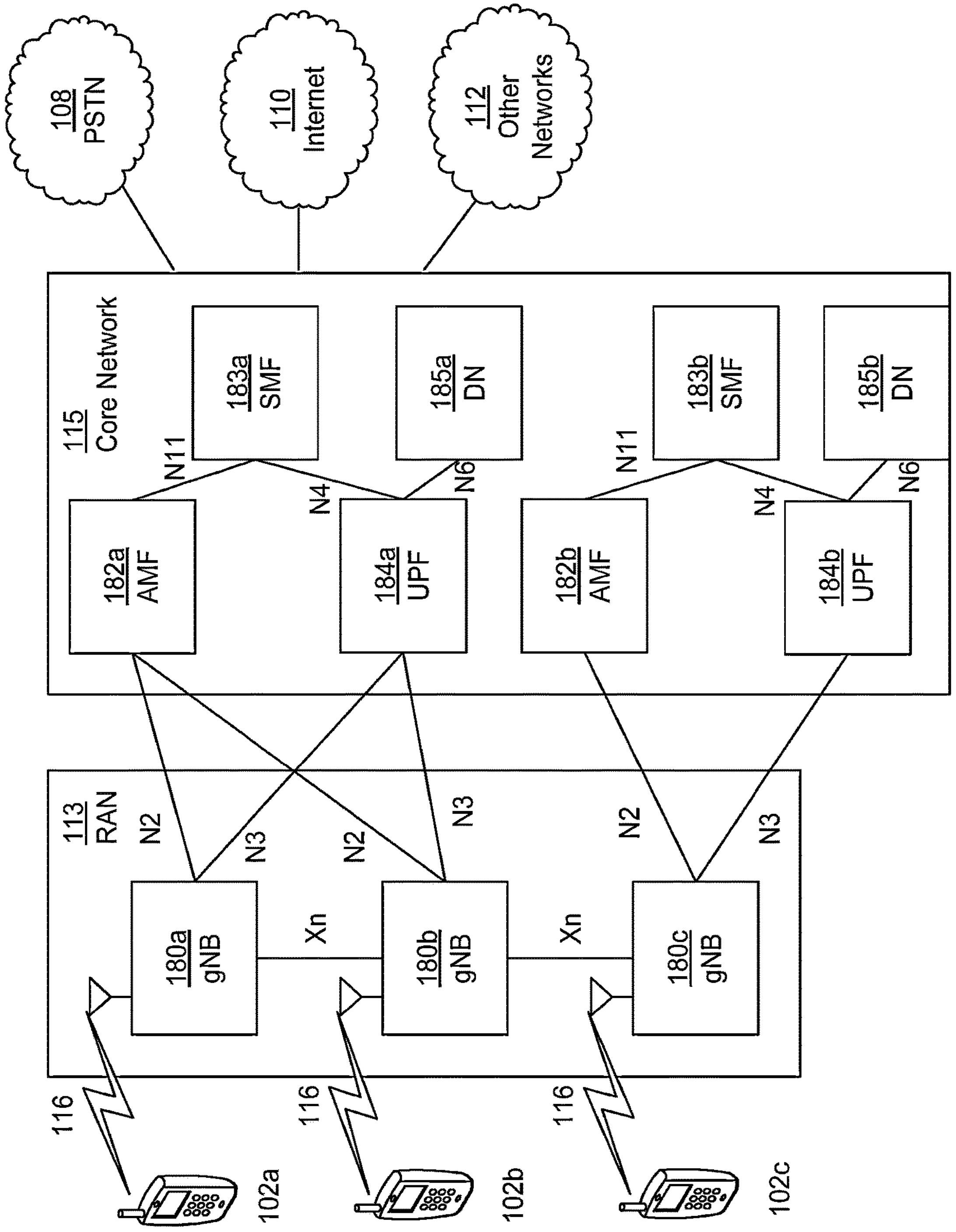
FIG. 13D is a system diagram of further example RAN and a further example CN that may be used within the communications system illustrated in FIG. 13A.

FIG. 13D is a system diagram illustrating the RAN 113 and the CN 115 according to an embodiment. As noted above, the RAN 113 may employ an NR radio technology to communicate with the WTRUs 102*a*, 102*b*, 102*c* over the air interface 116. The RAN 113 may also be in communication with the CN 115.

The RAN 113 may include gNBs 180*a*, 180*b*, 180*c*, though it will be appreciated that the RAN 113 may include any number of gNBs while remaining consistent with an embodiment. The gNBs 180*a*, 180*b*, 180*c* may each include one or more transceivers for communicating with the WTRUs 102*a*, 102*b*, 102*c* over the air interface 116. In one embodiment, the gNBs 180*a*, 180*b*, 180*c* may implement MIMO technology. For example, gNBs 180*a*, 108*b* may utilize beamforming to transmit signals to and/or receive signals from the gNBs 180*a*, 180*b*, 180*c*. Thus, the gNB 180*a*, for example, may use multiple antennas to transmit wireless signals to, and/or receive wireless signals from, the WTRU 102*a*. In an embodiment, the gNBs 180*a*, 180*b*, 180*c* may implement carrier aggregation technology. For example, the gNB 180*a* may transmit multiple component carriers to the WTRU 102*a* (not shown). A subset of these component carriers may be on unlicensed spectrum while the remaining component carriers may be on licensed spectrum. In an embodiment, the gNBs 180*a*, 180*b*, 180*c* may implement Coordinated Multi-Point (COMP) technology. For example, WTRU 102*a* may receive coordinated transmissions from gNB 180*a* and gNB 180*b* (and/or gNB 180*c*).

The WTRUs 102*a*, 102*b*, 102*c* may communicate with gNBs 180*a*, 180*b*, 180*c* using transmissions associated with a scalable numerology. For example, the OFDM symbol spacing and/or OFDM subcarrier spacing may vary for different transmissions, different cells, and/or different portions of the wireless transmission spectrum. The WTRUs 102*a*, 102*b*, 102*c* may communicate with gNBs 180*a*, 180*b*, 180*c* using subframe or transmission time intervals (TTIs) of various or scalable lengths (e.g., containing varying number of OFDM symbols and/or lasting varying lengths of absolute time).

The gNBs 180*a*, 180*b*, 180*c* may be configured to communicate with the WTRUs 102*a*, 102*b*, 102*c* in a standalone configuration and/or a non-standalone configuration. In the standalone configuration, WTRUs 102*a*, 102*b*, 102*c* may communicate with gNBs 180*a*, 180*b*, 180*c* without also accessing other RANs (e.g., such as eNode-Bs 160*a*, 160*b*, 160*c*). In the standalone configuration, WTRUs 102*a*, 102*b*, 102*c* may utilize one or more of gNBs 180*a*, 180*b*, 180*c* as a mobility anchor point. In the standalone configuration, WTRUs 102*a*, 102*b*, 102*c* may communicate with gNBs 180*a*, 180*b*, 180*c* using signals in an unlicensed band. In a non-standalone configuration WTRUs 102*a*, 102*b*, 102*c* may communicate with/connect to gNBs 180*a*, 180*b*, 180*c* while also communicating with/connecting to another RAN such as eNode-Bs 160*a*, 160*b*, 160*c*. For example, WTRUs 102*a*, 102*b*, 102*c* may implement DC principles to communicate with one or more gNBs 180*a*, 180*b*, 180*c* and one or more eNode-Bs 160*a*, 160*b*, 160*c* substantially simultaneously. In the non-standalone configuration, eNode-Bs 160*a*, 160*b*, 160*c* may serve as a mobility anchor for WTRUs 102*a*, 102*b*, 102*c* and gNBs 180*a*, 180*b*, 180*c* may provide additional coverage and/or throughput for servicing WTRUs 102*a*, 102*b*, 102*c*.

Each of the gNBs 180*a*, 180*b*, 180*c* may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184*a*, 184*b*, routing of control plane information towards Access and Mobility Management Function (AMF) 182*a*, 182*b* and the like. As shown in FIG. 13D, the gNBs 180*a*, 180*b*, 180*c* may communicate with one another over an Xn interface.

The CN 115 shown in FIG. 13D may include at least one AMF 182*a*, 182*b*, at least one UPF 184*a*, 184*b*, at least one Session Management Function (SMF) 183*a*, 183*b*, and possibly a Data Network (DN) 185*a*, 185*b*. While each of the foregoing elements are depicted as part of the CN 115, it will be appreciated that any of these elements may be owned and/or operated by an entity other than the CN operator.

The AMF 182*a*, 182*b* may be connected to one or more of the gNBs 180*a*, 180*b*, 180*c* in the RAN 113 via an N2 interface and may serve as a control node. For example, the AMF 182*a*, 182*b* may be responsible for authenticating users of the WTRUs 102*a*, 102*b*, 102*c*, support for network slicing (e.g., handling of different PDU sessions with different requirements), selecting a particular SMF 183*a*, 183*b*, management of the registration area, termination of NAS signaling, mobility management, and the like. Network slicing may be used by the AMF 182*a*, 182*b* in order to customize CN support for WTRUs 102*a*, 102*b*, 102*c* based on the types of services being utilized WTRUs 102*a*, 102*b*, 102*c*. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183*a*, 183*b* may be connected to an AMF 182*a*, 182*b* in the CN 115 via an N11 interface. The SMF 183*a*, 183*b* may also be connected to a UPF 184*a*, 184*b* in the CN 115 via an N4 interface. The SMF 183*a*, 183*b* may select and control the UPF 184*a*, 184*b* and configure the routing of traffic through the UPF 184*a*, 184*b*. The SMF 183*a*, 183*b* may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184*a*, 184*b* may be connected to one or more of the gNBs 180*a*, 180*b*, 180*c* in the RAN 113 via an N3 interface, which may provide the WTRUs 102*a*, 102*b*, 102*c* with access to packet-switched networks, such as the Internet 110, to facilitate communications between the WTRUs 102*a*, 102*b*, 102*c* and IP-enabled devices. The UPF 184, 184*b* may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102*a*, 102*b*, 102*c* with access to the other networks 112, which may include other wired and/or wireless networks that are owned and/or operated by other service providers. In one embodiment, the WTRUs 102*a*, 102*b*, 102*c* may be connected to a local Data Network (DN) 185*a*, 185*b* through the UPF 184*a*, 184*b* via the N3 interface to the UPF 184*a*, 184*b* and an N6 interface between the UPF 184*a*, 184*b* and the DN 185*a*, 185*b*.

In view of FIG. 13A-13D, and the corresponding description of FIG. 13A-13D, one or more, or all, of the functions described herein with regard to one or more of: WTRU 102*a-d*, Base Station 114*a-b*, eNode-B 160*a-c*, MME 162, SGW 164, PGW 166, gNB 180*a-c*, AMF 182*a-b*, UPF 184*a-b*, SMF 183*a-b*, DN 185*a-b*, and/or any other device (s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

The processes and techniques described herein may be implemented in a computer program, software, and/or firmware incorporated in a computer-readable medium for execution by a computer and/or processor. Examples of computer-readable media include, but are not limited to, electronic signals (transmitted over wired and/or wireless connections) and/or computer-readable storage media. Examples of computer-readable storage media include, but are not limited to, a read only memory (ROM), a random access memory (RAM), a register, cache memory, semiconductor memory devices, magnetic media such as, but not limited to, internal hard disks and removable disks, magneto-optical media, and/or optical media such as CD-ROM disks, and/or digital versatile disks (DVDs). A processor in association with software may be used to implement a radio frequency transceiver for use in a WTRU, terminal, base station, RNC, and/or any host computer.

What is claimed is:

1. A device for video decoding, comprising:
- a processor configured to:
  - obtain a combined inter merge-intra prediction (CIIP) indication that indicates whether CIIP is applied for a video block;
  - determine, based on the CIIP indication, that CIIP is applied for the video block;
  - determine that a merge mode is enabled for a picture that comprises the video block, wherein the merge mode allows a triangle partition of the video block to be predicted using a uni-prediction merge candidate associated with the video block;
  - determine to disable the merge mode for the video block based on determining that CIIP is applied for the video block; and
  - decode the video block based on disabling the merge mode for the video block.

2. The device of claim 1, wherein the merge mode is a triangle merge mode.

3. The device of claim 1, wherein the uni-prediction merge candidate associated with the video block is a first uni-prediction merge candidate associated with the video block, wherein the triangle partition is a first partition of the video block, and wherein the video block comprises the first partition and a second partition that is to be predicted using a second uni-prediction merge candidate associated with the video block.

4. The device of claim 3, wherein the first uni-prediction merge candidate and the second uni-prediction merge candidate are different.

5. The device of claim 3, wherein the processor is further configured to obtain a uni-prediction candidate list that comprises the first uni-prediction merge candidate and the second uni-prediction merge candidate.

6. The device of claim 1, wherein the processor is further configured to generate a uni-prediction candidate list based on a plurality of video blocks that are spatially adjacent to the video block and a plurality of video blocks that are temporally collocated to the video block.

7. The device of claim 1, wherein the processor is further configured to, based on the determination to disable the merge mode for the video block, determine that an indication for the merge mode is not signaled in video data.

8. A device for video encoding, comprising:

a processor configured to:

obtain a video block in a picture;

determine that combined inter merge-intra prediction (CIIP) is applied for the video block;

determine that a merge mode is enabled for the picture that comprises the video block, wherein the merge mode allows a triangle partition of the video block to be predicted using a uni-prediction merge candidate associated with the video block;

determine to disable the merge mode for the video block based on determining that CIIP is applied for the video block; and encode the video block based on disabling the merge mode for the video block.

9. The device of claim 8, wherein the merge mode is a triangle merge mode.

10. The device of claim 8, wherein the uni-prediction merge candidate associated with the video block is a first uni-prediction merge candidate associated with the video block, wherein the triangle partition is a first partition of the video block, and wherein the video block comprises the first partition and a second partition that is to be predicted using a second uni-prediction merge candidate associated with the video block.

11. The device of claim 10, wherein the first uni-prediction merge candidate and the second uni-prediction merge candidate are different.

12. The device of claim 10, wherein the processor is further configured to obtain a uni-prediction candidate list that comprises the first uni-prediction merge candidate and the second uni-prediction merge candidate.

13. The device of claim 8, wherein the processor is further configured to generate the uni-prediction candidate list based on a plurality of video blocks that are spatially adjacent to the video block and a plurality of video blocks that are temporally collocated to the video block.

14. A method for video decoding, comprising:

obtaining a combined inter merge-intra prediction (CIIP) indication that indicates whether CIIP is applied for a video block;

determining, based on the CIIP indication, that CIIP is applied for the video block;

determining that a merge mode is enabled for a picture that comprises the video block, wherein the merge mode allows a triangle partition of the video block to be predicted using a uni-prediction merge candidate associated with the video block;

determining to disable the merge mode for the video block based on determining that CIIP is applied for the video block; and decoding the video block based on disabling the merge mode for the video block.

15. The method of claim 14, wherein the merge mode is a triangle merge mode.

16. The method of claim 14, wherein the uni-prediction merge candidate associated with the video block is a first uni-prediction merge candidate associated with the video block, wherein the triangle partition is a first partition of the video block, and wherein the video block comprises the first partition and a second partition that is to be predicted using a second uni-prediction merge candidate associated with the video block.

17. The method of claim 16, further comprising generating a uni-prediction candidate list based on a plurality of video blocks that are spatially adjacent to the video block and a plurality of video blocks that are temporally collocated to the video block, and wherein the uni-prediction candidate list comprises the first uni-prediction merge candidate and the second uni-prediction merge candidate.

18. A method for video encoding, comprising:

obtaining a video block in a picture;

determining that combined inter merge-intra prediction (CIIP) is applied for the video block;

determining that a merge mode is enabled for the picture that comprises the video block, wherein the merge mode allows a triangle partition of the video block to be predicted using a uni-prediction merge candidate associated with the video block;

determining to disable the merge mode for the video block based on determining that CIIP is applied for the video block; and encoding the video block based on disabling the merge mode for the video block.

19. The method of claim 18, wherein the merge mode is a triangle merge mode.

20. The method of claim 18, wherein the uni-prediction merge candidate associated with the video block is a first uni-prediction merge candidate associated with the video block, wherein the triangle partition is a first partition of the video block, and wherein the video block comprises the first partition and a second partition that is to be predicted using a second uni-prediction merge candidate associated with the video block.

* * * * *